United States Patent
Singh et al.

(10) Patent No.: US 9,699,712 B2
(45) Date of Patent: *Jul. 4, 2017

(54) OPTIMIZED SIGNALING OF PRIMARY SCRAMBLING CODES AND FREQUENCY LISTS IN WIRELESS COMMUNICATIONS

(71) Applicant: QUALCOMM Incorporated, San Diego, CA (US)

(72) Inventors: Damanjit Singh, San Diego, CA (US); Jen Mei Chen, San Diego, CA (US); Manoj M. Deshpande, San Diego, CA (US); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/619,001

(22) Filed: Feb. 10, 2015

(65) Prior Publication Data

US 2015/0156685 A1    Jun. 4, 2015

Related U.S. Application Data

(63) Continuation of application No. 12/573,541, filed on Oct. 5, 2009, now Pat. No. 8,995,998.

(Continued)

(51) Int. Cl.
*H04W 36/00* (2009.01)
*H04W 48/16* (2009.01)
(Continued)

(52) U.S. Cl.
CPC ............ *H04W 48/16* (2013.01); *H04W 48/12* (2013.01); *H04W 4/08* (2013.01); *H04W 48/02* (2013.01); *H04W 84/045* (2013.01); *Y02B 60/50* (2013.01)

(58) Field of Classification Search
CPC ...... H04W 60/00; H04W 48/16; H04W 72/04
See application file for complete search history.

(56) References Cited

U.S. PATENT DOCUMENTS 7,480,278 B2 *   1/2009   Pedersen et al. ............. 370/335
2004/0136342 A1  7/2004   Pedersen et al.
(Continued)

FOREIGN PATENT DOCUMENTS

CN    101166133 A    4/2008
EP    1641299        3/2006

OTHER PUBLICATIONS

3GPP E-Mail Reflector: "3GPP_TSG_RAN_WG2 Archives Nov. 2008 (#5)", Nov. 2, 2008, 8 Pages URL: http://list.etsi.org/scripts/wa.exe?A2=ind0811&L=3gpp_tsg_ran_wg2&T=0&P=670.

(Continued)

*Primary Examiner* — Khalid Shaheed
(74) *Attorney, Agent, or Firm* — Courtney Yadegar-Bandari

(57) ABSTRACT

Systems and methodologies are described that facilitate communicating PSC split information regarding neighboring cells. The PSC split information can be transmitted in one or more overhead messages selected based on network deployment. Where macro cells and femto cells provide PSC split information, which can be a PSC range for related cells, PSC list, etc., the information can be transmitted in a low priority overhead message since it can be obtained at a source cell. Where only femto cells or closed subscriber group (CSG) cells provide PSC split information, the information can be transmitted in a higher priority more frequently transmitted message. In this regard, the information is available at target cells since not all devices can access CSG cells. Thus, by providing the PSC split information in a more frequently transmitted message, devices can retrieve (Continued)

the PSC split information early on in communications to lower power consumption.

87 Claims, 14 Drawing Sheets

Related U.S. Application Data

(60) Provisional application No. 61/112,532, filed on Nov. 7, 2008, provisional application No. 61/113,091, filed on Nov. 10, 2008, provisional application No. 61/115,491, filed on Nov. 17, 2008.

(51) Int. Cl.
*H04W 48/12* (2009.01)
*H04W 4/08* (2009.01)
*H04W 48/02* (2009.01)
*H04W 84/04* (2009.01)

(56) References Cited

U.S. PATENT DOCUMENTS

| | | | |
|---|---|---|---|
| 2005/0232214 A1* | 10/2005 | Dottling et al. | 370/342 |
| 2006/0178153 A1* | 8/2006 | Tenny et al. | 455/450 |
| 2007/0093253 A1* | 4/2007 | Lindoff et al. | 455/450 |
| 2008/0076411 A1 | 3/2008 | Khetawat et al. | |
| 2009/0274086 A1 | 11/2009 | Petrovic et al. | |
| 2009/0325674 A1* | 12/2009 | Hosokawa | 463/20 |
| 2010/0093350 A1 | 4/2010 | Wang et al. | |
| 2010/0120426 A1 | 5/2010 | Singh et al. | |
| 2010/0323633 A1 | 12/2010 | Pani et al. | |
| 2012/0122460 A1 | 5/2012 | Dalsgaard et al. | |

OTHER PUBLICATIONS

3GPP TS, 25.331, v8.1.0, (Dec. 2007), pp. 1-225.
[63bis_UTRA_B05] Email discussion to capture RAN2 agreements on UMTS HNB in 25.304 and 25.331, Retrieved from URL: http://list.etsi.org/scripts/wa.exe?A2=ind0810&L=3GPP_TSG_RAN_WG2&F=&S=&P=260238, Oct. 29, 2008, 3 pages.
Amirijoo M., et al., "Neigbor Cell Relation List and Physical cell Identity Self Orgainization LTE", May 30, 2008, pp. 1-5.
"Cell Identification for HNB" 3GPP Draft; R2-083588 Cell Identification for HNB, 3rd Generation Partnership Project (3GPP), Mobile Competence Centre ; Sophia-Antipolis Cedex ; France, vol. RAN WG2, No. Warsaw, Poland; _Jul. 2, 2008, Jul. 2, 2008 (Jul. 2, 2008), XP050140957 [retrieved on Jul. 2, 2008] the whole document.
CSG ID: 10.3.2.9, Version: Rel 8, 10.2.48.8.6—System Information Block type 3, 2008, 5 pages.
Ericsson: "Reduction of neighbour cell list information sent to UE", [Online] vol. R2-063305, No. 56, Nov. 6, 2006 (Nov. 6, 2006), pp. 1-5, XP002481651. Retrieved from the Internet: URL:www.3gpp.org> [retrieved on Oct. 31, 2006].
ETSI TS 125 331 V8.4.0 (Oct. 2008), Universal Mobile Telecommunications System (UMTS); Radio Resource Control (RRC); Protocol specification (3GPP TS 25.331 version 8.4.0 Release 8), 1542 pages.
ETSI TS 136 331 V8.3.0, "LTE: Evolved Universal Terrestrial Radio Access (E-UTRA), Radio Resource Control (RRC)", Protocol specification, 3GPP TS 36.331, version 8.3.0, Release 8, Nov. 2008, 181 pages.
International Search Report and Written Opinion—PCT/US2009/063763, International Search Authority—European Patent Office—Apr. 1, 2010.
Lee T., et al., 3rd Generation Partnership Project 2 "3GPP2", 'Interworking between eHRPD and LTE CSG', Jun. 2008, pp. 1-14.
NTT DOCOMO et al., "Cell ID Assignment for Home Node B" 3GPP Draft; R1-073684 Cell ID Assignment for Home Node B, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Aug. 15, 2007, Aug. 15, 2007 (Aug. 15, 2007), XP050107280 [retrieved on Aug. 15, 2007] p. 2-p. 4.
QUALCOMM Europe, "CR 25.331 on Reserved PSC and Dedicated Carrier Signaling for CSG Deployment", 3GPP TSG-RAN WG2 #64, 2008, 15 pages. URL: http://www.3gpp.org/ftp/tsg_ran/WG2_RL2/TSGR2_64/Docs/R2-086291.zip.
QUALCOMM Europe, "CR on SIB20 to Support PSC and Frequency Information for CSG Cells," 3GPP TSG-RAN WG2 #64, R2-08XXXX, 25.331, Prague, CZ, Nov. 10-14, 2008, pp. 1-23.
QUALCOMM Europe: "H(e)NB PCI/PSC and Frequency Identification", 3GPP TSG-RAN WG2 #63-Bis, R2-085475, Oct. 3, 2008, 3 Pages. URL: http://www.3gpp.org/ftp/tsg_ran/WG2_RL2/TSGR2_63bis/Docs/R2-085475.zip.
Huawei: "PSC/PCI split handling and clarifications", 3GPP TSG RAN WG2 #64 Tdoc, R2-086246, Nov. 3, 2008, pp. 1-4.

* cited by examiner

OPTIMIZED SIGNALING OF PRIMARY SCRAMBLING CODES AND FREQUENCY LISTS IN WIRELESS COMMUNICATIONS

CLAIM OF PRIORITY UNDER 35 U.S.C. §120

The present Application for Patent is a Continuation of U.S. application Ser. No. 12/573,541, entitled "OPTIMIZED SIGNALING OF PRIMARY SCRAMBLING CODES AND FREQUENCY LISTS IN WIRELESS COMMUNICATIONS", filed on Oct. 5, 2009, which in turn claims priority to the following U.S. Provisional Applications: Application No. 61/112,532 entitled "METHOD AND APPARATUS TO PROVIDE OPTIMIZED SIGNALING AND EFFICIENT USER EQUIPMENT READING OF PRIMARY SCRAMBLING CODES/FREQUENCY LIST RESERVED FOR HOME NODE B/CLOSED SUBSCRIBER GROUP CELLS", filed Nov. 7, 2008; Application No. 61/113,091 entitled "METHOD TO PROVIDE OPTIMIZED SIGNALING AND EFFICIENT UE READING OF PSCs (PRIMARY SCRAMBLING CODES)/FREQUENCY LIST RESERVED FOR HNB/CSG CELLS", filed Nov. 10, 2008; Application No. 61/115,491 entitled "METHOD AND APPARATUS TO PROVIDE OPTIMIZED SIGNALING AND EFFICIENT USER EQUIPMENT READING OF PRIMARY SCRAMBLING CODES/FREQUENCY LIST RESERVED FOR HOME NODE B/CLOSED SUBSCRIBER GROUP CELLS", filed Nov. 17, 2008; each of the foregoing are assigned to the assignee hereof and hereby expressly incorporated by reference herein.

BACKGROUND

Field

The following description relates generally to wireless communications, and more particularly to signaling primary scrambling code (PSC) information and/or dedicated frequency lists for closed subscriber group (CSG) cells.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more access points (e.g., base stations) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. As mobile devices move throughout wireless network service areas, cells utilized for communication, which are provided by one or more access points (e.g., macro cells, femto cells, pico cells, etc.), can be selected/reselected by the mobile device. Information regarding selection/reselection or other access parameters can be sent to mobile devices in one or more system information blocks (SIB), which can be periodically transmitted according to a pre-configured scheduling and/or priority of the SIB. In addition, access points can use a primary scrambling code (PSC) (e.g., over a pilot or other channels) to identify and/or descramble communications from the access point (e.g., SIBs or otherwise).

Some access points (also called CSG cells) can be a part of closed subscriber group (CSG) accessible only by certain mobile devices. Mobile devices can be provisioned with and/or can maintain lists of such CSG cells that indicate whether the mobile device is allowed or disallowed access to the access points (e.g., white list or blacklist). In this regard, the mobile devices can conserve power during cell selection/reselection by consulting a white list and/or blacklist, to determine whether a CSG cell is allowed, before attempting access to a respective CSG cell. Mobile device can also be provided with and/or can maintain lists/ranges that identify CSG cells according to utilized PSCs (e.g., CSG PSC split information). In this regard, the mobile devices can further conserve power during cell selection/reselection by avoiding these CSG cells altogether without reading any broadcast information (such as SIBS) if the mobile devices do not desire or are not allowed access on any CSG cell in the group. Also, the PSC lists/ranges can be used to optimize search for CSG cells and reselect to them with appropriate parameters. In addition, CSG cells operating over similar frequencies can be deployed and assigned a range of PSCs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating efficiently transmitting primary scrambling code (PSC) split information to mobile devices in different deployment models. In one deployment model, for example, macro cell and femto cell access points can transmit the PSC split information for related frequencies in a lower priority, less frequently transmitted overhead message, such as one used to transmit measurement control information. To this end, mobile devices can receive the PSC split information from a currently camped-on cell. In another deployment model, for example, femto cell access points alone can transmit the PSC split information in a higher priority, more frequently transmitted overhead message, such as one that includes cell selection/reselection parameters, cell access restriction parameters, etc. In this regard, mobile devices can receive the information early on in communicating with the access point. Since some of the femtocell access points can be accessible to only certain mobile devices (e.g., closed subscriber group (CSG) cells), sending PSC split information in overhead message that is sent either more or as frequently as overhead message containing CSG identity or cell access restriction parameters allows mobile devices to receive PSC split information even from the cells that do not allow access. In either case, the PSC split information can relate to, in one example, a PSC range or list for one or more cells on a frequency, and the devices can utilize the information to avoid, exploit or otherwise search for, select/reselect, etc., cells using one or more PSCs provided by PSC split information.

According to related aspects, a method is provided that includes receiving PSC split information related to one or more cells in one of a plurality of overhead messages based at least in part on a network deployment. The method also includes utilizing the PSC split information to identify at least one of the one or more cells based at least in part on a broadcast signal received from the at least one of the one or more cells.

Another aspect relates to a wireless communications apparatus. The wireless communications apparatus can include at least one processor configured to obtain PSC split information relating to one or more cells in one of a plurality of overhead messages based at least in part on a network deployment. The at least one processor is further configured to store the PSC split information to indicate cells to avoid or exploit in subsequent cell identifying. The wireless communications apparatus also comprises a memory coupled to the at least one processor.

Yet another aspect relates to an apparatus. The apparatus includes means for receiving an overhead message comprising PSC split information related to one or more cells, wherein the overhead message in which the PSC split information is received is based at least in part on a network deployment. The apparatus also includes means for determining the PSC split information from the overhead message and means for storing the PSC split information to indicate cells to exploit or avoid in subsequent cell searching.

Still another aspect relates to a computer program product, which can have a computer-readable medium including code for causing at least one computer to receive PSC split information related to one or more cells in one of a plurality of overhead messages based at least in part on a network deployment. The computer-readable medium can also comprise code for causing the at least one computer to utilize the PSC split information to identify at least one of the one or more cells based at least in part on a broadcast signal received from the at least one of the one or more cells.

Moreover, an additional aspect relates to an apparatus including an overhead message processing component that obtains an overhead message comprising PSC split information related to one or more cells, wherein the overhead message in which the PSC split information is received is based at least in part on a network deployment. The apparatus can further include a PSC split information receiving component that determines the PSC split information from the overhead message and a PSC split information storing component that stores the PSC split information to indicate cells to exploit or avoid in subsequent cell searching.

According to another aspect, a method is provided that includes receiving PSC split information relating to one or more cells of similar type and operating over similar frequencies. The method further includes selecting an overhead message for transmitting the PSC split information based at least in part on a network deployment and transmitting the overhead message including the PSC split information to one or more wireless devices.

Another aspect relates to a wireless communications apparatus. The wireless communications apparatus can include at least one processor configured to receive PSC split information related to one or more cells operating over a similar frequency and determine an overhead message for transmitting the PSC split information based at least in part on a network deployment. The at least one processor is further configured to transmit the overhead message to one or more devices using the overhead message. The wireless communications apparatus also comprises a memory coupled to the at least one processor.

Yet another aspect relates to an apparatus. The apparatus includes means for receiving PSC split information related to one or more cells operating over a similar frequency and means for selecting an overhead message within which to include the PSC split information based at least in part on a network deployment. The apparatus also includes means for providing the overhead message with the PSC split information to one or more wireless devices.

Still another aspect relates to a computer program product, which can have a computer-readable medium including code for causing at least one computer to receive PSC split information relating to one or more cells of similar type and operating over similar frequencies. The computer-readable medium can also comprise code for causing the at least one computer to select an overhead message for transmitting the PSC split information based at least in part on a network deployment and code for causing the at least one computer to transmit the overhead message including the PSC split information to one or more wireless devices.

Moreover, an additional aspect relates to an apparatus including a PSC split information determining component that receives PSC split information related to one or more cells operating over a similar frequency. The apparatus can further include an overhead message generating component that selects an overhead message within which to include the PSC split information based at least in part on a network deployment and an overhead message transmitting component that provides the overhead message with the PSC split information to one or more wireless devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

DETAILED DESCRIPTION

Figure 1:
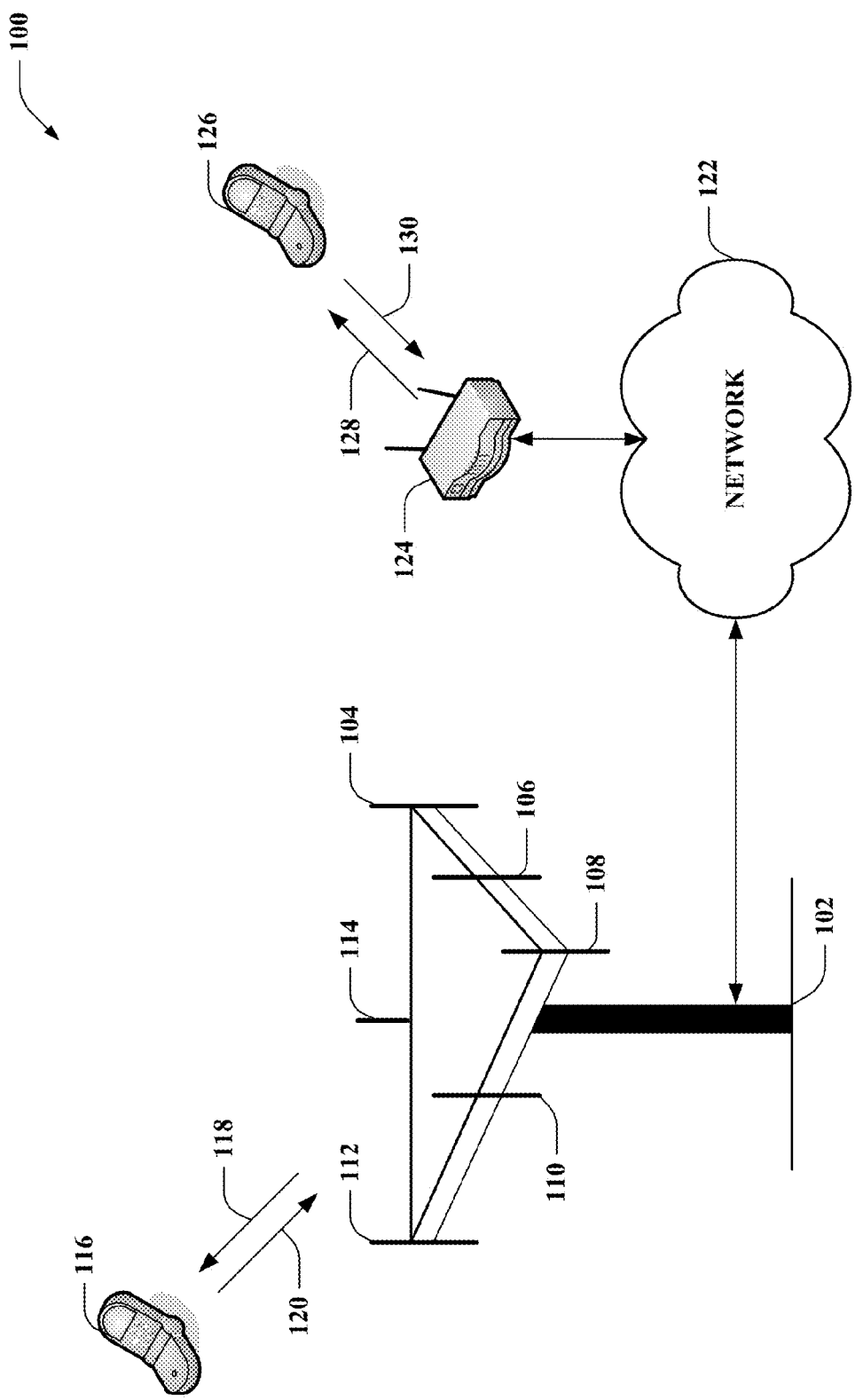
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B (e.g., evolved Node B (eNB), and/or the like), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 126; however, it is to be appreciated that base station 102 can communicate with substantially any number of mobile devices similar to mobile devices 116 and 126. Mobile devices 116 and 126 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency.

Each group of antennas and/or the area in which they are designated to communicate can be referred to as a sector or cell of base station 102. For example, antenna groups can be designed to communicate to mobile devices in a sector of the areas covered by base station 102. In communication over forward link 118, the transmitting antennas of base station 102 can utilize beamforming to improve signal-to-noise ratio of forward link 118 for mobile device 116. Also, while base station 102 utilizes beamforming to transmit to mobile device 116 scattered randomly through an associated coverage, mobile devices in neighboring cells can be subject to less interference as compared to a base station transmitting through a single antenna to all its mobile devices. Moreover, mobile devices 116 and 126 can communicate directly with one another using a peer-to-peer or ad hoc technology.

In addition, the base station 102 can communicate with a network 122, which can be one or more networks including a wireless service access network (e.g., a 3G network), over a backhaul link connection. The network 122 can store information regarding access parameters related to the mobile device 116 and 126 and other parameters of a wireless access network to provide service to the devices 116 and 126. Furthermore, a femto cell access point 124 can be provided to facilitate communicating with the mobile device 126 over forward link 128 and reverse link 130 (similarly to forward link 118 and reverse link 120, as described supra). The femto cell access point 124 can provide access to one or more mobile devices 126 much like the base station 102, but on a smaller scale. In one example, femto cell access point 124 can be configured in a residence, business, and/or other close range setting (e.g., theme park, stadium, apartment complex, etc.). The femto cell access point 124 can connect to the network 122 utilizing a backhaul link connection, which can be over a broadband Internet connection (T1/T3, digital subscriber line (DSL), cable, etc.), in one example. The network 122 can similarly provide access information for the mobile device 126.

According to an example, mobile devices 116 and 126 can travel over service areas initiating wireless access or performing cell reselection among disparate base stations and/or femto cells during travel or while stationary. In this regard, the mobile devices 116 and 126 can effectuate continuous wireless service seamless to users of the mobile devices 116 and 126. In one example (not shown), mobile device 126 can have been communicating with the base station 102 similarly to the mobile device 116, and can have moved into a specified range of the femto cell access point 124. In this regard, the mobile device 126 can have reselected one or more cells related to the femto cell access point 124 to receive more desirable wireless service access. In addition, where mobile device 126 moves toward base station 102, it can reselect a cell related thereto, at some point, for a variety of reasons (e.g., to mitigate interference on the femto cell access point 124, to receive a more optimal signal or increased throughput, etc.).

In traveling over the service area, a given mobile device 116 and/or 126 can measure signal quality of available base stations (such as base station 102), femto cells (such as femto cell access point 124), and/or other access points, to determine when cell reselection is suitable to the mobile device 116 and/or 126, according to standard specific rules and/or algorithms. Based on one or more of the measurements, the mobile device 116 and/or 126 can rank access points for reselection. Upon determining the ranking, the mobile device 116 and/or 126 can attempt cell reselection with the highest ranking access point. In an example, however, femto cell access point 124 can be a closed subscriber group (CSG) access point, to which mobile device 116 and/or 126 may or may not be allowed access.

According to an example, base station 102 and femto cell access point 124 can transmit primary scrambling code (PSC) split information that relates to access points operating on the same or similar frequency as the respective access point. For example, the PSC split information can indicate a list or range of PSCs assigned to similar cells operating in the frequency. In another example, the PSC split information can be a bit indicating whether the frequency is a CSG cell only frequency. Base station 102 and femto cell access point 124 can receive such information according to hardcoding, a specification, from one or more upstream network components, one or more access points, and/or the like, for instance. In this example, base station 102 and femto cell access point 124 can transmit, and mobile devices 116 and 126 can receive, the PSC split information in an overhead message that is transmitted relatively infrequently, such as in a message that includes measurement control information, dedicated CSG frequency lists, and/or the like. Since mobile devices 116 and 126 receive the PSC list from a currently camped-on cell, they can consistently store such information for subsequent use in evaluating cells on the same frequency. For instance, mobile devices 116 and 126 can identify cells according to PSCs in the list and utilize the identification to avoid, exploit, select/reselect, etc., the identified cells.

According to another example, femto cell access point 124 alone can transmit the PSC split information. In this example, femto cell access point 124 can include the PSC split information in an overhead message transmitted more frequently than that utilized where base station 102 is additionally transmitting PSC split information, such as an overhead message comprising cell selection/reselection information. In this regard, since mobile device 116 and/or 126 may not be able to access femto cell access point 124 (e.g., where it provides CSG cells), mobile device 116 and/or 126 can receive the PSC split information early in communicating with the femto cell access point 124, so that it has the PSC split information once communications with the femto cell access point 124 cease due to CSG restrictions. Mobile devices 116 and/or 126 can subsequently utilize the PSC split information in avoiding, searching for or exploiting, selecting/reselecting, etc., cells based on PSC. It is to be appreciated that such efficient receipt and utilization of the PSC split information can conserve power on the mobile devices 116 and/or 126 and mitigate interference to the femto cell access point 124.

Figure 2:
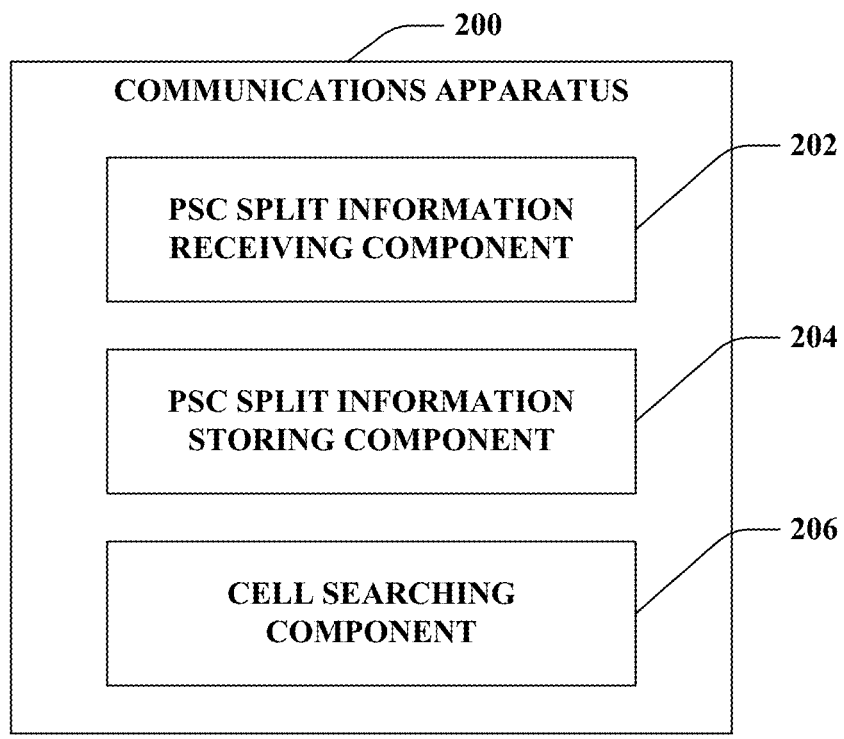
FIG. 2 is an illustration of an example communications apparatus for employment within a wireless communications environment.

Turning to FIG. 2, illustrated is a communications apparatus 200 for employment within a wireless communications environment. The communications apparatus 200 can be a mobile device or a portion thereof, or substantially any communications apparatus that communicates over and/or receives access to a wireless network. The communications apparatus 200 can include a PSC split information receiving component 202 that can obtain PSC split information related to a frequency from one or more access points providing cell coverage over the frequency, a PSC split information storing component 204 that holds the PSC split information for subsequent query or other utilization, and a cell searching component 206 that locates neighboring cells as part of a cell selection/reselection procedure or otherwise.

According to an example, PSC split information receiving component 202 can extract PSC split information from one or more received overhead messages. As described, the PSC split information can be received according to a deployment model. In one model, the PSC split information receiving component 202 can extract the PSC split information from lower priority overhead messages received relatively infrequently, when compared to similar overhead messages, where macro cell and femto cell access points (not shown) both transmit PSC split information. In one example, the overhead message comprising the PSC split information can include lower priority parameters such as management control information (e.g., a system information block (SIB) 11bis, SIB20, or a similar message in a 3GPP LTE specification). In a deployment where only femto cells or CSG cells provide PSC split information, for example, the PSC split information receiving component 202 can additionally or alternatively extract the PSC split information from a higher priority overhead message sent more frequently than similar overhead messages. For example, this higher priority overhead message can include other high priority parameters, such as cell selection/reselection parameters (e.g., a SIB3 or similar message in a 3GPP LTE specification), other access restriction parameters, and/or the like.

In either case, PSC split information storing component 204 can store the PSC split information for subsequent use; as described, the PSC split information can include a list of PSCs utilized by other cells provided in the frequency, a range of such PSCs, other dedicated frequency information, and/or the like. Cell searching component 206 can consult the PSC split information in the PSC split information storing component 204 in performing one or more operations relating to selecting one or more cells. For example, during cell selection/reselection, cell searching component 206 can locate cells within a specified range of communications apparatus 200 for subsequent selecting/reselecting, which can be ranked according to desirability. In addition, as described, cells can be verified against a white list of allowed cells (or blacklist of prohibited cells).

Where the PSC split information storing component 204 has PSC split information regarding a certain frequency, however, cells having a PSC in the range can be avoided, explicitly searched for by the cell searching component 206, etc. For example, where the PSC split information includes PSCs of one or more desired cells, cell searching component 206 can favor or explicitly search for cells within the PSC range. Similarly, where the PSC split information contains PSCs of any undesired or inaccessible cells (such as an inaccessible CSG access point), cell searching component 206 can avoid querying cells in the PSC range. As described, PSCs can be identified via a pilot channel such that cell searching component 206 can avoid or include the related access point based on the pilot channel without further inquisition based on the PSC, for example.

Figure 3:
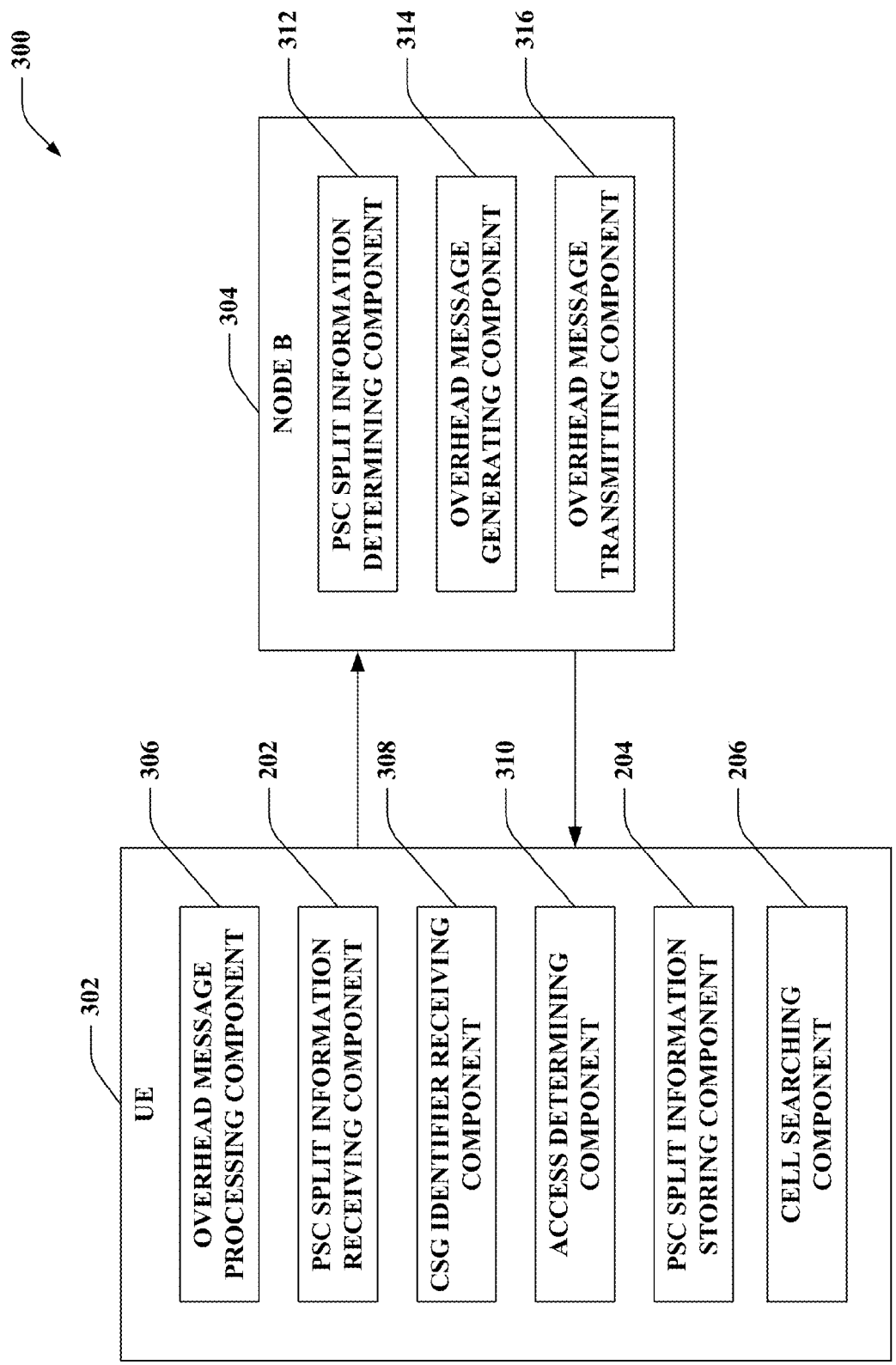
FIG. 3 is an illustration of an example wireless communications system that effectuates communicating PSC split information.

Now referring to FIG. 3, illustrated is a wireless communications system 300 that facilitates efficiently communicating PSC information to devices in a wireless network according to one or more deployment models. System 300 includes a UE 302, which can be a mobile device (including not only independently powered devices, but also modems, for example), a portion thereof, or substantially any wireless device that communicates with Node B 304 to attempt accessing a wireless network. Node B 304 can be a macro cell, femto cell, or pico cell base station, for example, a mobile device, or a portion thereof, or substantially any device that provides access to a wireless network. Moreover, system 300 can be a MIMO system and/or can conform to one or more wireless network system specifications (e.g., EV-DO, 3GPP, 3GPP2, 3GPP LTE, WiMAX, etc.) and can comprise additional components to facilitate communication between UE 302 and Node B 304.

UE 302 can include an overhead message processing component 306 that receives and analyzes overhead messages from one or more sources, which can include SIBs for example, a PSC split information receiving component 202 that can obtain a PSC range or related information from one or more overhead messages, a CSG identifier receiving component 308 that can obtain an identifier of a CSG cell from one of the overhead messages, an access determining component 310 that can discern whether UE 302 can communicate with an access point related to the CSG identifier, a PSC split information storing component 204 that can store the PSC range or related information for subsequent use, and a cell searching component 206 that can locate cells for selection/reselection or other operations based at least in part on the PSC range. Node B 304 includes a PSC split information determining component 312 that receives a PSC range or other split information related to a frequency utilized by the Node B 304, an overhead message generating component 314 that creates one or more overhead messages related to communicating with the UE 302, and an overhead message transmitting component 316 that provides the one or more overhead messages to one or more devices.

According to an example, PSC split information determining component 312 can obtain PSC split information regarding access points or related cells operating over the same or similar frequency as Node B 304. The PSC split information determining component 312, for example, can receive the PSC split information from a core network, disparate Node B, mobile device, and/or the like. In another example, the PSC split information determining component 312 can establish the PSC split information based on a configuration, specification, hardcoding, etc. Overhead message generating component 314 can populate one or more created overhead messages with the PSC split information. As described, where macro cell access points and femto cell access points transmit the PSC split information, overhead message generating component 314 can include the PSC split information in a low priority, infrequently transmitted overhead message (e.g., SIB11bis and/or the like). Where only femto cell access points are providing PSC split information, overhead message generating component 314 can include the PSC split information in a higher priority, frequently transmitted overhead message (e.g., SIB3 and/or the like). It is to be appreciated that where SIB3 is utilized, the SIB3 message may become segmented; this may not be an issue when Node B is a femto cell, however, since SIB3 can be transmitted more frequently by Node Bs in this case.

In an example, overhead message generating component 314 can determine which overhead message(s) to populate with PSC split information based at least in part on a network specification, hardcoding, configuration, and/or the like. In another example, a wireless network component (and/or a disparate Node B) can specify the overhead message(s) to populate (or a related parameter), and the Node B 304 can receive the indication over a backhaul link, wireless access link, etc. Once the overhead message generating component 314 so populates the overhead message, overhead message transmitting component 316 can transmit the overhead message in a wireless network, as described. The PSC split information can include one or more PSC ranges, for example, with a starting PSC representing an initial PSC of the first range, number of PSCs in each range, and an optional offset for the second PSC range that relates to a number of PSCs between each PSC range.

Overhead message processing component 306 can receive and analyze overhead messages transmitted by Node B 304. As described, the overhead messages, in an example, can correspond to one or more SIBs defined in a network specification. PSC split information receiving component 202 can decode one or more of the overhead messages to obtain PSC split information. PSC split information receiving component 202 can determine which overhead message to decode to receive the PSC split information based on a specification, configuration, hardcoding, and/or the like. As previously described, the overhead message can be a low priority message, such as a SIB11bis, or a higher priority message, such as a SIB3. For example, where network 300 is deployed such that macro cell access points and femto cell access points both broadcast PSC split information, the PSC split information receiving component 202 can decode the PSC split information from a lower priority overhead message. In this regard, UE 302 can be camping on Node B 304 and can receive the PSC split information from its source access point. Where network 200 is deployed such that only femto cell access points transmit PSC split information, however, UE 302 only obtains PSC split information when communicating with a femto cell access point, which may provide CSG cells within which UE 302 is not authorized to operate.

In this example, CSG identifier receiving component 308 can additionally obtain a CSG identifier or other access restriction parameters for the CSG cell from Node B 304 in the higher priority message (e.g., the same SIBS message as the PSC split information). Access determining component 310 can discern whether access is permitted in the CSG cell, which can be based on the CSG identifier or other access restriction parameters, such as a flag indicating whether some or all UEs are allowed on the CSG cell. In one example, access determining component 310 can attempt to locate the CSG identifier in a white list of allowed CSG cells (or a blacklist of disallowed CSG cells). UE 302 can receive the white list from Node B 304 (e.g., in an overhead message), a configuration, specification, hardcoding, and/or the like. If the UE 302 can access the Node B 304 in the CSG cell or the white list is not empty, PSC split information storing component 204 can store the PSC split information as a desirable PSC range to search or exploit in subsequent selection/reselection and/or the like over the frequency utilized by Node B 304 to provide the CSG cell.

Similarly, for example, if the UE cannot access the Node B 304 in the CSG cell and the white list is empty, PSC split information storing component 204 can store the PSC split information as a PSC range to avoid in subsequent selection/reselection over the frequency used by Node B 304 to provide the CSG cell. At this point, once the PSC split information is obtained and it is determined that UE 302 is not allowed to access Node B 304, UE 302 can evaluate other cells for reselection. This conserves power consumption on the UE 302 since the UE 302 need not wait around for additional overhead messages including additional information regarding the Node B 304. Rather, UE 302 has the PSC split information at the time it determines it is not allowed to access the CSG cell and can cease communicating with the Node B 304 at that time. In either case, PSC split information receiving component 202 can compute the PSCs in the range according to the PSC split information. Thus, for example, where a starting PSC and number of PSCs are received in the PSC split information, the PSCs can be calculated as the set $\{s, ((s+1) \bmod 512), ((s+2) \bmod 512), \ldots, ((s+n-1) \bmod 512)\}$, where s is the starting PSC and n is the number of PSCs. Where the PSC split information additionally includes a range 2 offset, the PSCs for the second PSC range can be calculated similarly as the set above where s for the second set would be the starting PSC+number of PSCs−1+the range 2 offset.

As described, cell searching component 206 can locate neighboring cells and can utilize the PSC split information in initially evaluating the neighboring cells. Thus, for example, if the PSC of the neighboring cell is in PSC split information and the white list is not empty, cell searching component 206 can search/measure the cell for selection/reselection or other tasks. Similarly, if the PSC is in PSC split information and the white list is empty, cell searching component 206 can avoid the cell without needing to retrieve a CSG identifier. It is to be appreciated that the PSC split information can be utilized for other purposes. For example, PSC split information can be associated with reselection parameters such that UE 302 can apply reselection parameters when reselecting to a cell having a PSC within the PSC range. In addition, Node B 304 can transmit neighbor lists to the UE 302, which can be processed to identify neighboring Node Bs. In one example, the neighbor list can comprise PSCs that identify the Node Bs, and PSC split information storing component 204 can determine whether PSCs exist in the neighbor list that are not present in the PSC split information. If so, PSC split information storing component 204 can store the PSCs in the neighbor list and not present in the PSC split information as macro cell (or non-CSG cell) PSCs.

Figure 4:
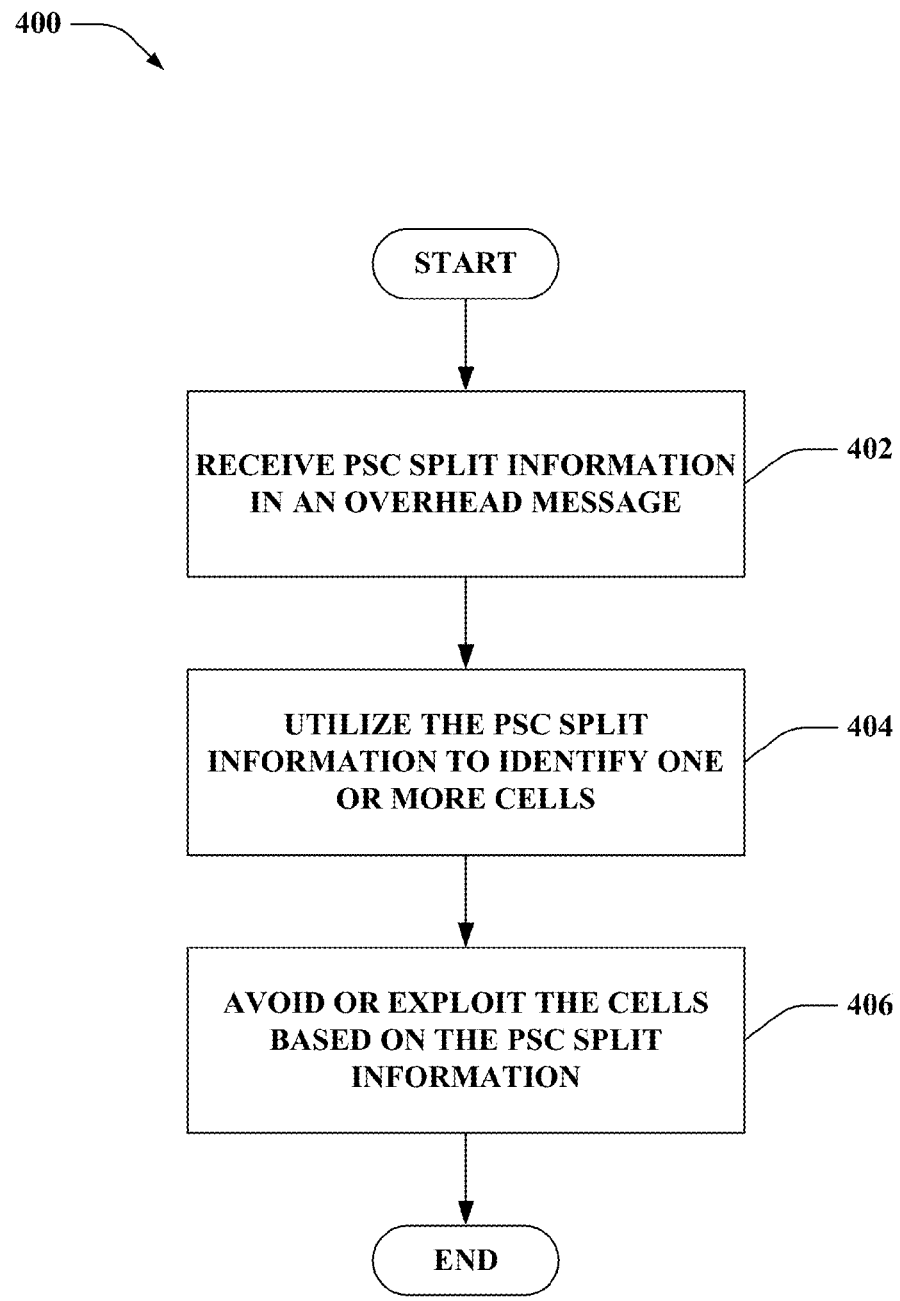
FIG. 4 is an illustration of an example methodology that facilitates receiving and utilizing PSC split information.
Figure 5:
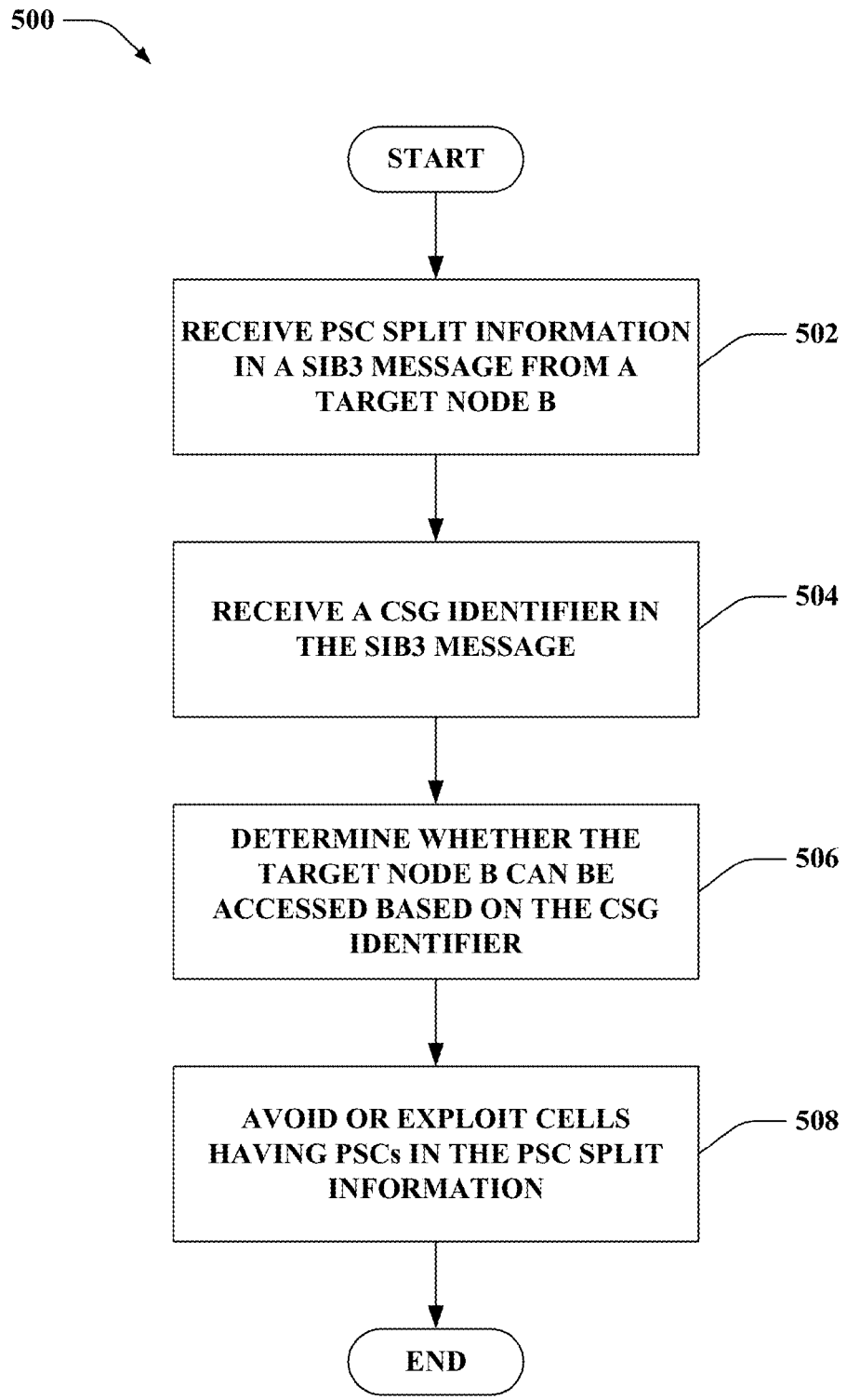
FIG. 5 is an illustration of an example methodology that facilitates classifying PSC split information based on cell accessibility.
Figure 6:
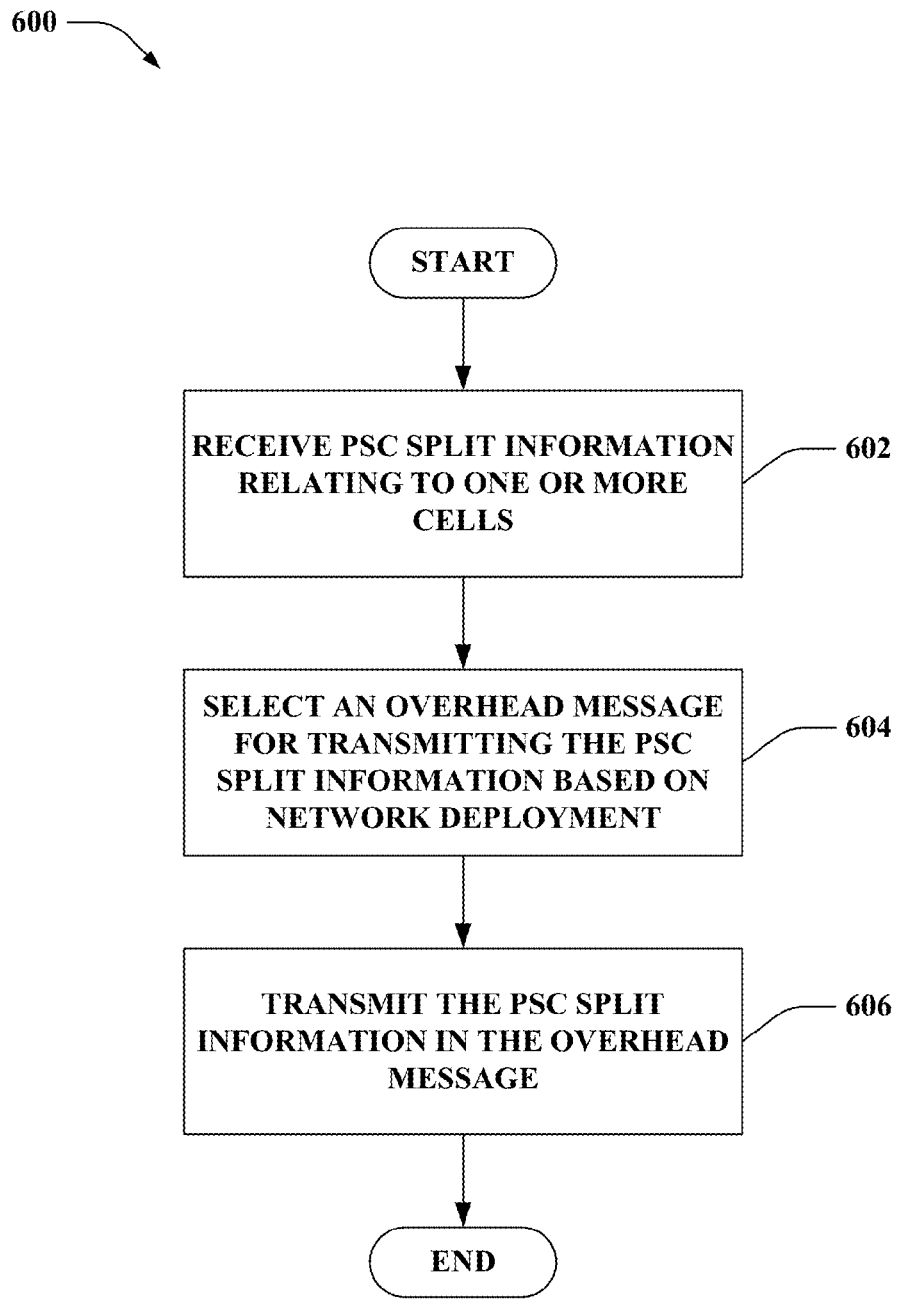
FIG. 6 is an illustration of an example methodology that facilitates transmitting PSC split information.

Referring to FIGS. 4-6, methodologies relating to provisioning PSC split information related to one or more cells are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 4, an example methodology 400 is illustrated that facilitates receiving PSC split information and utilizing the information in subsequent cell searching. At 402, PSC split information is received in an overhead message. As described, this can be a low priority infrequently sent message, such as a SIB11bis or similar message, a higher priority more frequently transmitted message, such as a SIB3 or similar message, and/or the like based at least in part on network deployment. At 404, the PSC split information can be utilized to identify one or more cells. For example, in searching neighboring cells, a PSC can be obtained from the pilot of the cells and checked against the PSC split information. At 406, cells can be avoided or exploited based on the PSC split information. For example, if the white list is empty, cells having PSCs in the received PSC split information can be avoided in subsequent cell searching for selection/reselection purposes. Similarly, if the white list is not empty, cells having PSCs in the received PSC split information can be exploited in cell search and cell selection/reselection.

Referring to FIG. 5, an example methodology 500 that facilitates receiving PSC split information in SIB3 messages is illustrated. At 502, PSC split information can be received in a SIB3 message from a target Node B. SIB3 messages can be transmitted more frequently than other SIB messages, which can ensure that the PSC split information is received early in communications with the target Node B. At 504, a CSG identifier can also be received in the SIB3 message. At 506, it can be determined whether the target Node B can be accessed based on the CSG identifier. In one example, as described, the CSG identifier can be compared to a white list of CSG cell identifiers that represent a set of CSG cells that can be camped-on. At 508, cells having PSCs in the PSC split information can be avoided or exploited based on whether any CSG cell can be accessed. Thus, for example, where the white list is empty, CSG cells on the frequency having PSCs in the PSC split information are not accessible, and can thus be avoided. Since the target Node B cannot be accessed, information regarding accessibility and PSC split information can be obtained early on in communicating with the target Node B such that communications can cease with the target Node B upon determining that it is not accessible without having to wait for the PSC split information. This can conserve battery consumption by avoiding unnecessary reading of any other overhead messages from the target Node B, as described above.

Turning to FIG. 6, an example methodology 600 is shown that facilitates providing PSC split information to one or more devices based on a network deployment. At 602, PSC split information can be received relating to one or more cells. As described, this information can be received from one or more network components (e.g., upstream and/or downstream), a specification, configuration, hardcoding, and/or the like. The PSC split information can relate to PSCs utilized by other access points operating on the frequency and/or of similar type, such as in a multi-cell deployment where a block of PSCs are reserved and assigned to the multiple cells. At 604, an overhead message can be selected for transmitting the PSC split information based on network deployment. For example, the network deployment can specify whether only femto cell or CSG access points are allowed to transmit PSC split information, whether macro cell and femto cell access points alike can transmit the information, etc. In the former case, a high priority frequently transmitted message can be selected to provide the PSC split information, since devices may only get the information from target cells. In the latter case, however, a lower priority more infrequently transmitted overhead message can be selected. At 606, the PSC split information can be transmitted in the overhead message.

It will be appreciated that, in accordance with one or more aspects described herein, inferences can be made regarding selecting an overhead message for transmitting PSC split information, determining which overhead message comprises the PSC split information, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
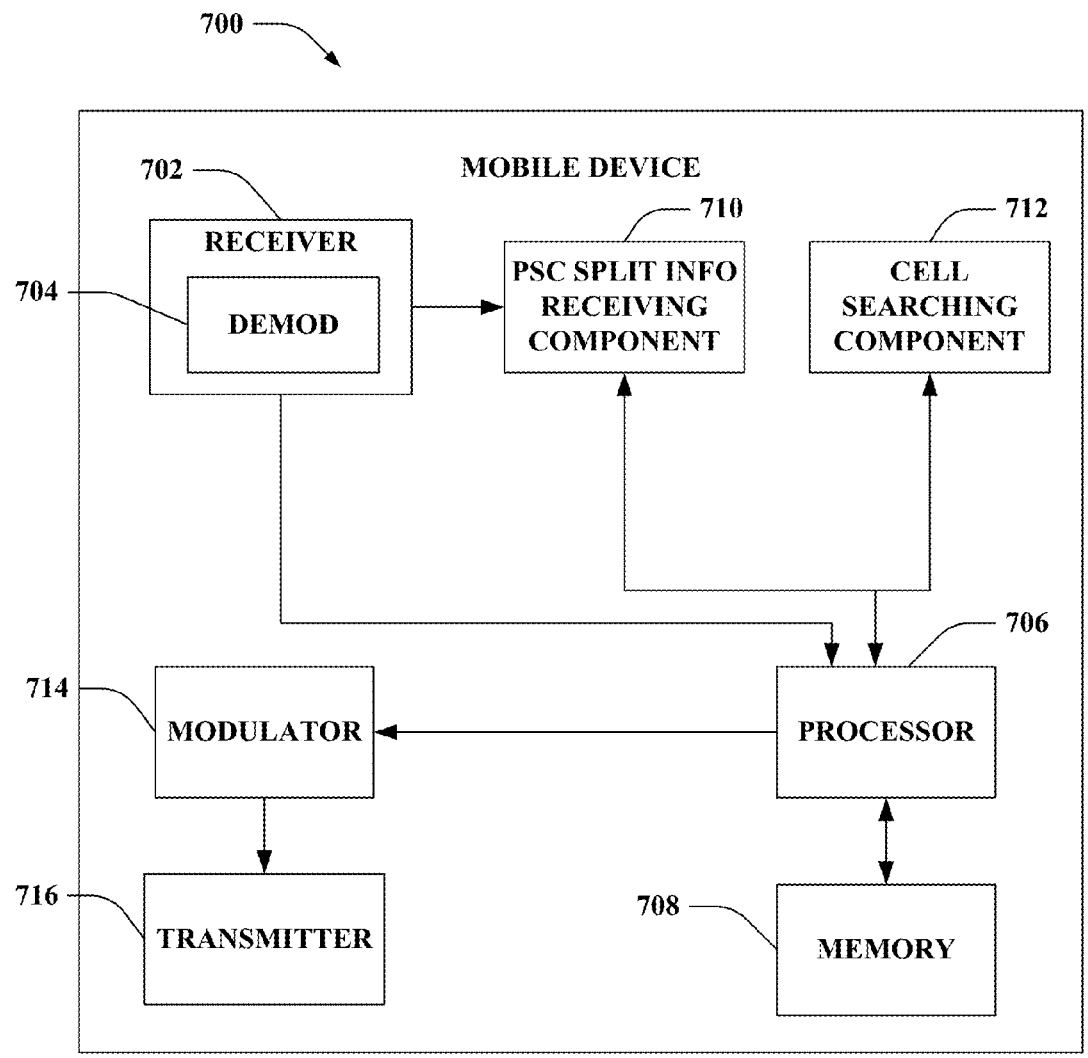
FIG. 7 is an illustration of an example mobile device that facilitates receiving and utilizing PSC split information.

FIG. 7 is an illustration of a mobile device 700 that facilitates receiving and utilizing PSC split information. Mobile device 700 comprises a receiver 702 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 and/or processor 706 can further be operatively coupled to a PSC split information receiving component 710 that obtains PSC split information from one or more access points. As described, the PSC split information can be received in one or more overhead messages depending on network deployment (e.g., a high priority frequently transmitted message such as SIB3, a lower priority message such as SIB11bis, and/or the like). Moreover, PSC split information receiving component 710 can store the information in memory 708. As described, PSC split information can be used to avoid, exploit or otherwise search for, select/reselect, etc. one or more cells having PSCs included in PSC split information.

Moreover, for example, mobile device 700 can receive a neighbor list comprising PSCs of neighboring access points, as described. PSC split information receiving component 710 can additionally compare PSCs in the PSC split information to the PSCs of the neighbor list. Where PSCs exist in the neighbor list that are not in the PSC split information, PSC split information receiving component 710 can store the PSCs in memory 708 as relating to macro cell access points. Processor can also be coupled to a cell searching component 712 that evaluates one or more neighboring cells according to the PSC split information. In one example, in a cell selection/reselection procedure, cell searching component 712 can locate neighboring cells ignoring those that have a PSC within the PSC split information where the PSC split information is stored in memory 708 as relating to PSCs to avoid. Mobile device 700 still further comprises a modulator 714 and transmitter 716 that respectively modulate and transmit signals to, for instance, a base station, another mobile device, etc. Although depicted as being separate from the processor 706, it is to be appreciated that the PSC split information receiving component 710, cell searching component 712, demodulator 704, and/or modulator 714 can be part of the processor 706 or multiple processors (not shown).

Figure 8:
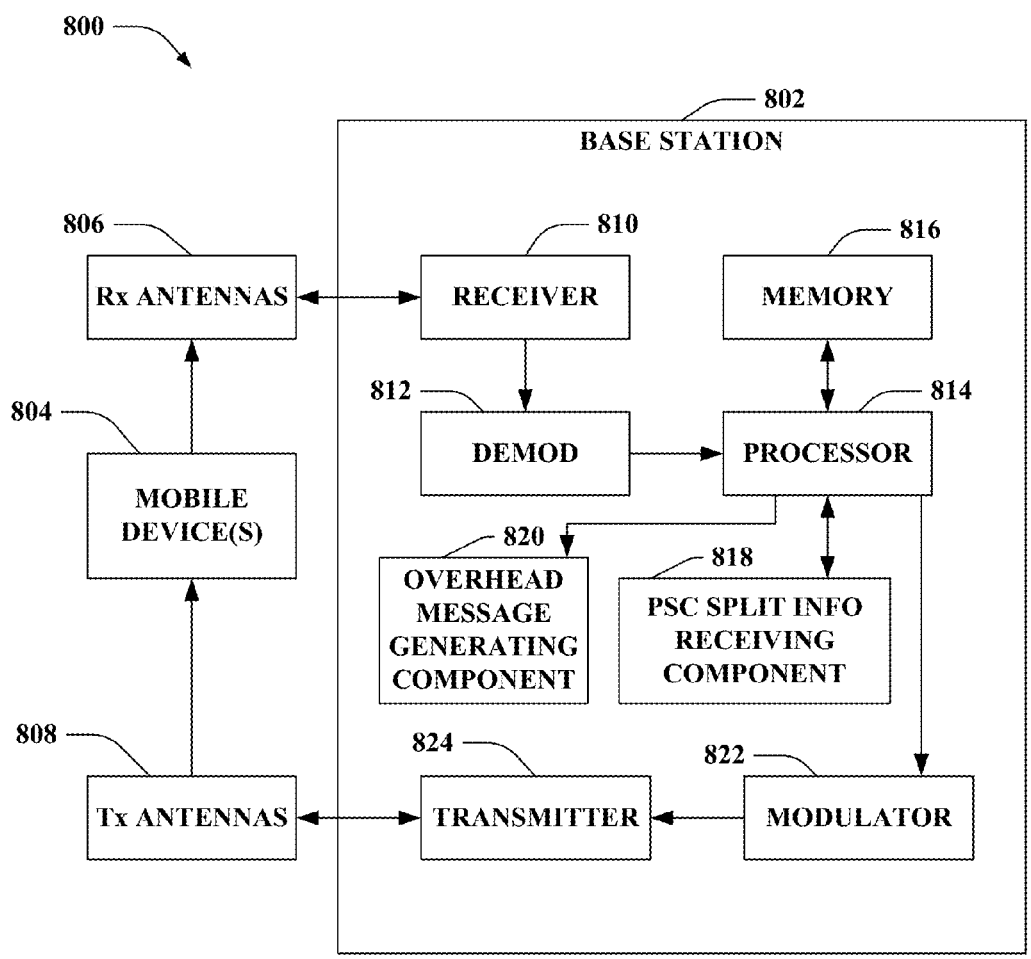
FIG. 8 is an illustration of an example system that provisions PSC split information to one or more wireless devices.

FIG. 8 is an illustration of a system 800 that facilitates providing PSC split information to one or more mobile devices. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a descrambler that can decode received signals. Furthermore, demodulator 812 can demodulate received descrambled signals. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a PSC split information receiving component 818 that receives PSC split information related to one or more cells, and an overhead message generating component 820 that creates overhead messages for transmitting to one or more mobile devices 804.

According to an example, PSC split information receiving component 818 can receive PSC split information from a network component, configuration, specification, hardcoding, and/or the like. Overhead message generating component 820 can insert the PSC split information into one or more overhead messages, as described previously, based on a network deployment. For example, if only femto cell access points or CSG cells are to provide PSC split information, overhead message generating component 820 can include the PSC split information in a high priority frequently transmitted message, such as a SIB3, to ensure mobile devices 804 receive the PSC split information early in communicating with the base station 802. In this regard, if the mobile devices 804 are not allowed to access the base station 802, they can disconnect upon determining that connection is not allowed and can have received the PSC split information, for example.

If the network deployment specifies that both macro cell and femto cell access points can provide PSC split information, the overhead message generating component 314 can include the information in a lower priority message, such as a SIB11bis, since mobile devices 804 can then receive the information from a serving or source base station. Furthermore, although depicted as being separate from the processor 814, it is to be appreciated that the demodulator 812, PSC split information receiving component 818, overhead message generating component 820, and/or modulator 822 can be part of the processor 814 or multiple processors (not shown).

Figure 9:
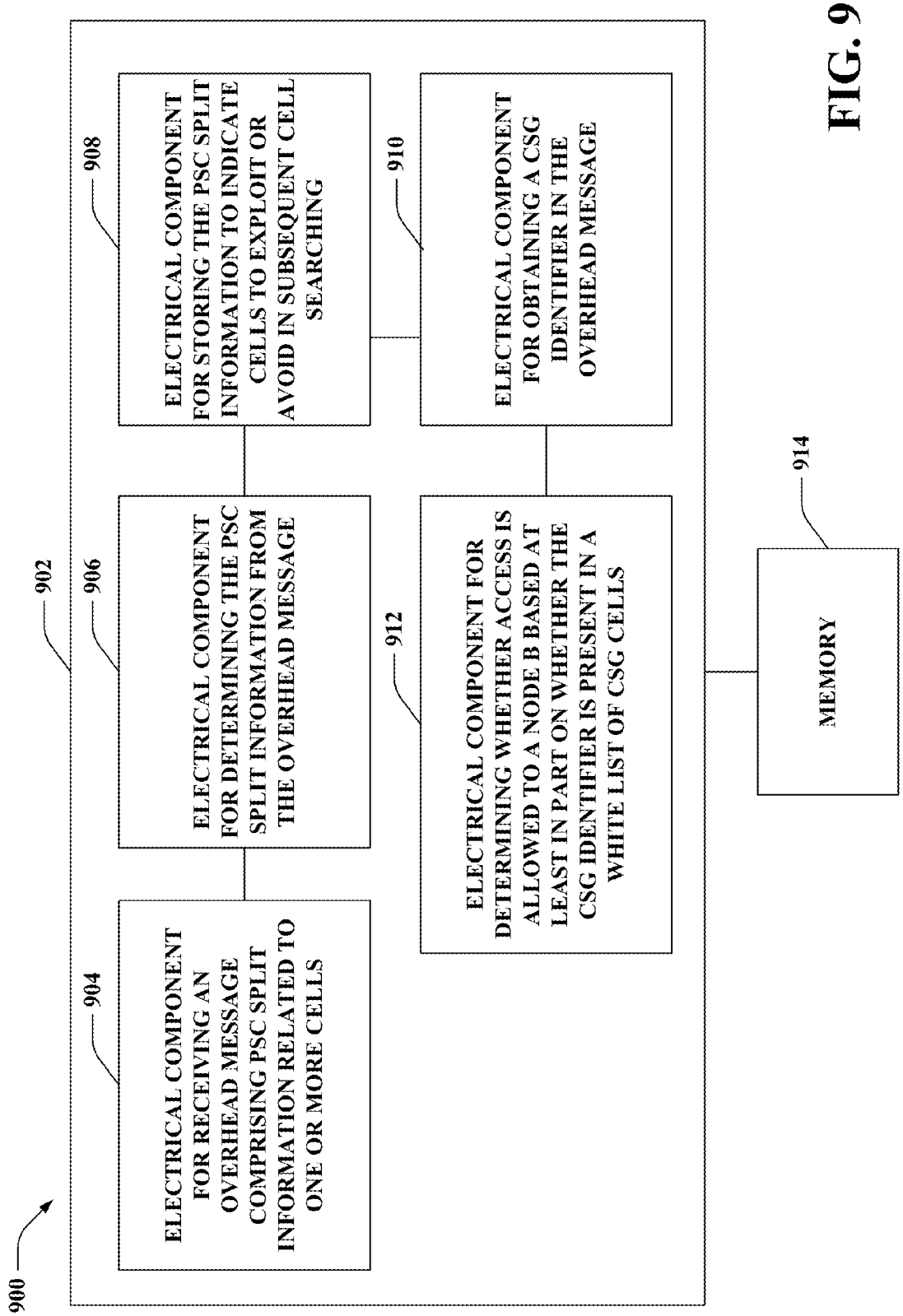
FIG. 9 is an illustration of an example system that receives PSC split information along with cell selection/reselection parameters.

With reference to FIG. 9, illustrated is a system 900 that receives and utilizes PSC split information related to one or more cells. For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving an overhead message comprising PSC split information related to one or more cells 904. For example, as described, the PSC split information can be received in a high priority frequently transmitted overhead message that includes parameters regarding cell selection/reselection, such as a SIB3 message. In another example, the PSC split information can be received in a lower priority more infrequently transmitted overhead message, such as a SIB11bis message. Further, logical grouping 902 can comprise an electrical component for determining the PSC split information from the overhead message 906. As described, the PSC split information can be extracted from the overhead message by determining that the message comprises the information (e.g., by explicit indication in the message or from one or more disparate messages, inference based on determining a network deployment, and/or the like).

Furthermore, logical grouping 902 can include an electrical component for storing the PSC split information to indicate cells to exploit or avoid in subsequent cell searching 908. To this end, logical grouping 902 can also include an electrical component for obtaining a CSG identifier in the overhead message 910 and an electrical component for determining whether access is allowed to a Node B based at least in part on whether the CSG identifier is present in a white list of CSG cells 912. Additionally, system 900 can include a memory 914 that retains instructions for executing functions associated with electrical components 904, 906, 908, 910, and 912. While shown as being external to memory 914, it is to be understood that one or more of electrical components 904, 906, 908, 910, and 912 can exist within memory 914.

Figure 10:
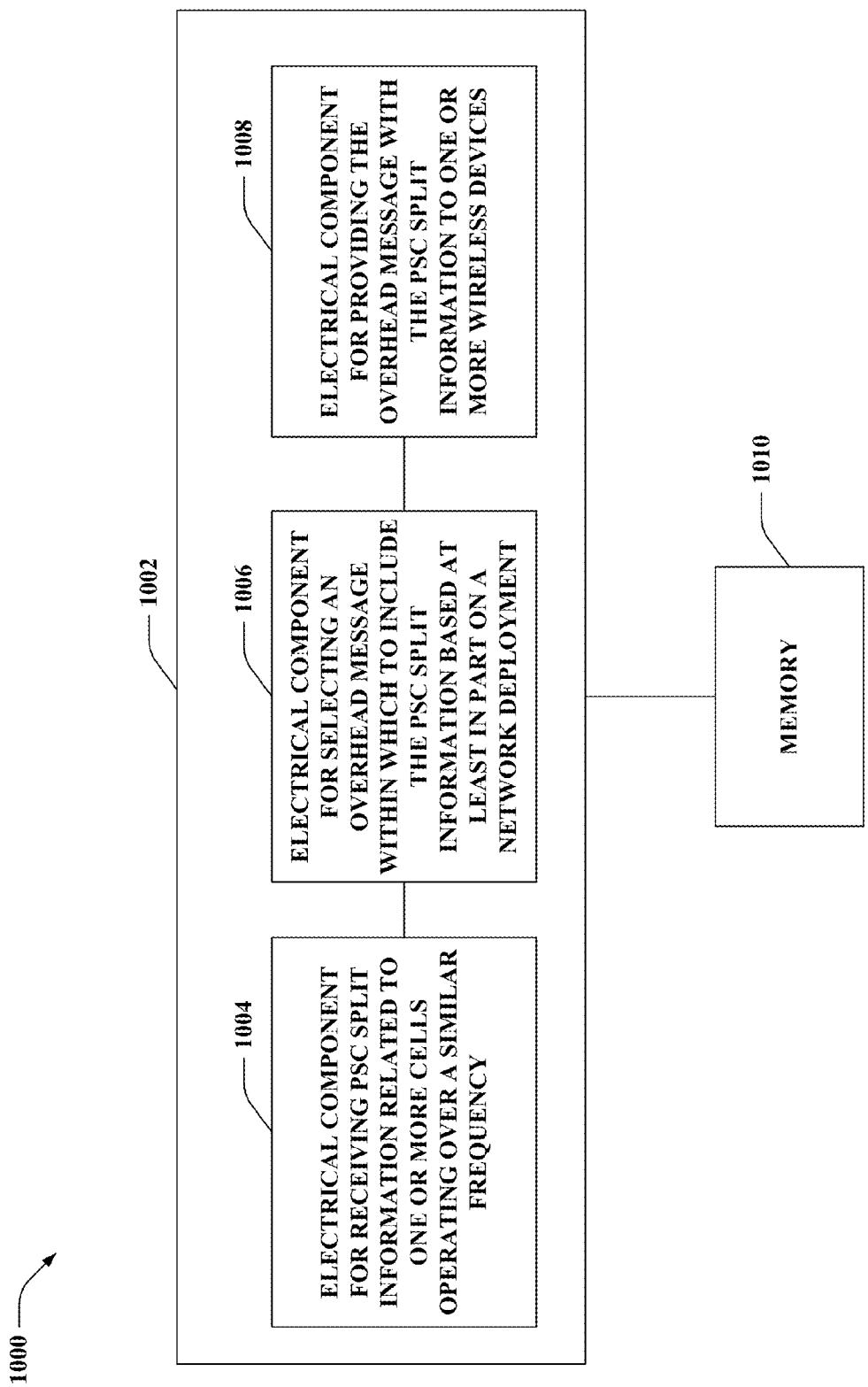
FIG. 10 is an illustration of an example system that facilitates transmitting PSC split information to one or more wireless devices.

With reference to FIG. 10, illustrated is a system 1000 for provisioning PSC split information to wireless devices. For example, system 1000 can reside at least partially within a wireless network component. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for receiving PSC split information related to one or more cells operating over a similar frequency 1004. As described, the PSC split information can be received from one or more network devices, specification, configuration, hardcoding, etc. Further, logical grouping 1002 can comprise an electrical component for selecting an overhead message within which to include the PSC split information based at least in part on a network deployment 1006. As described, where the network deployment specifies that only femto cell access points provide PSC split information, electrical component 1006 can select a high priority frequently transmitted overhead message, such as SIB3, for including the PSC split information.

In another example, as described, where the network deployment specifies that macro cells and femto cells alike can transmit PSC split information, electrical component 1006 can select a lower priority overhead message, such as SIB11bis, for providing the PSC split information to wireless devices (e.g., since the devices can receive the PSC split information from source access points). Furthermore, logical grouping 1002 can include an electrical component for providing the overhead message with the PSC split information to one or more wireless devices 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal (AT) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNode B, macro cell, and so on. Also, a femto node may be configured or referred to as a Home Node B, Home eNode B, access point base station, femto cell, and so on.

Figure 11:
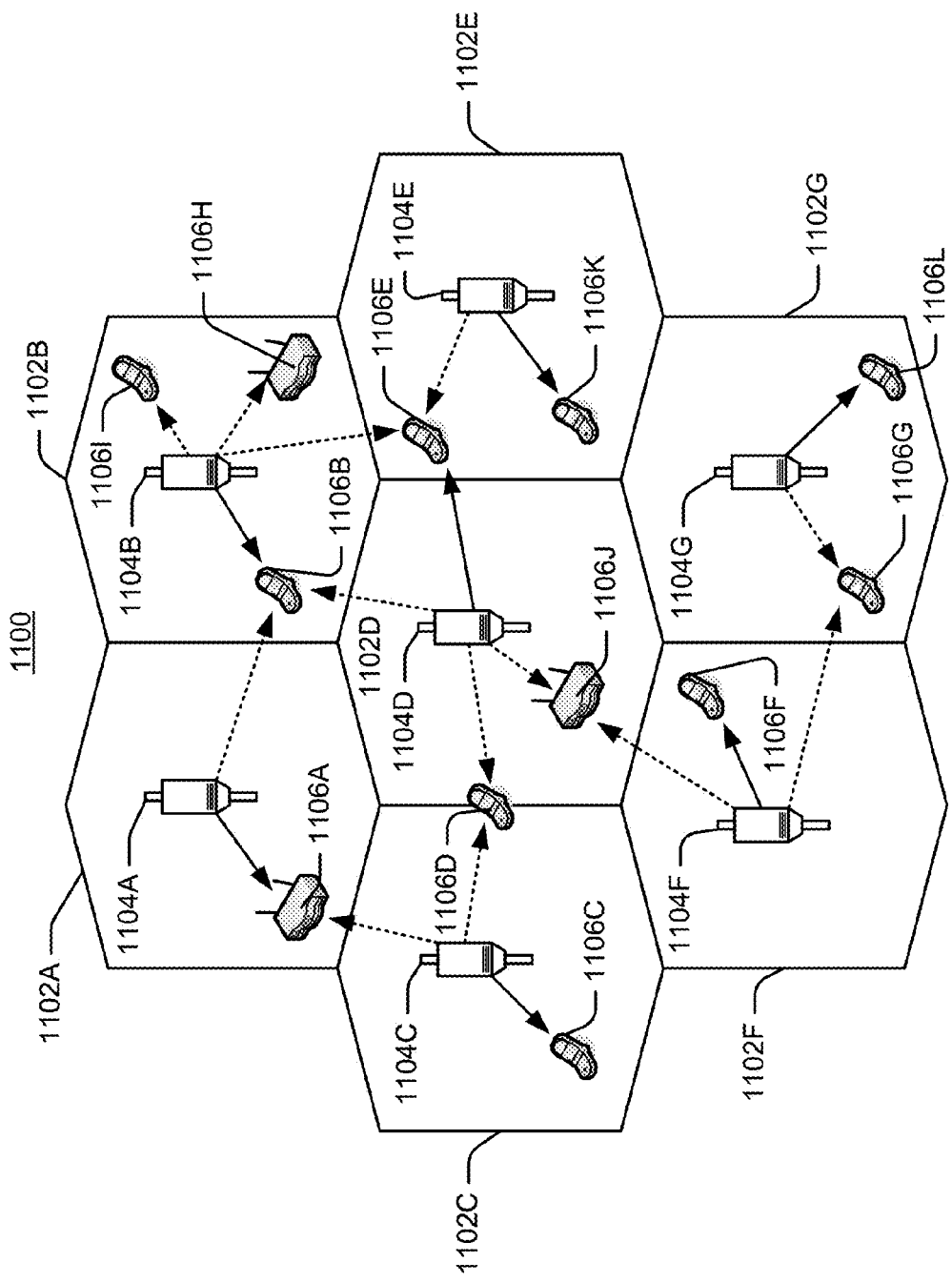
FIG. 11 is an illustration of an example wireless network environment that facilitates providing macro cell and femto cell access point communication.

FIG. 11 illustrates a wireless communication system 1100, configured to support a number of users, in which the teachings herein may be implemented. The system 1100 provides communication for multiple cells 1102, such as, for example, macro cells 1102A-1102G, with each cell being serviced by a corresponding access node 1104 (e.g., access nodes 1104A-1104G). As shown in FIG. 11, access terminals 1106 (e.g., access terminals 1106A-1106L) may be dispersed at various locations throughout the system over time. Each access terminal 1106 may communicate with one or more access nodes 1104 on a forward link (FL) and/or a reverse link (RL) at a given moment, depending upon whether the access terminal 1106 is active and whether it is in soft handoff, for example. The wireless communication system 1100 may provide service over a large geographic region. For example, macro cells 1102A-1102G may cover a few blocks in a neighborhood.

Figure 12:
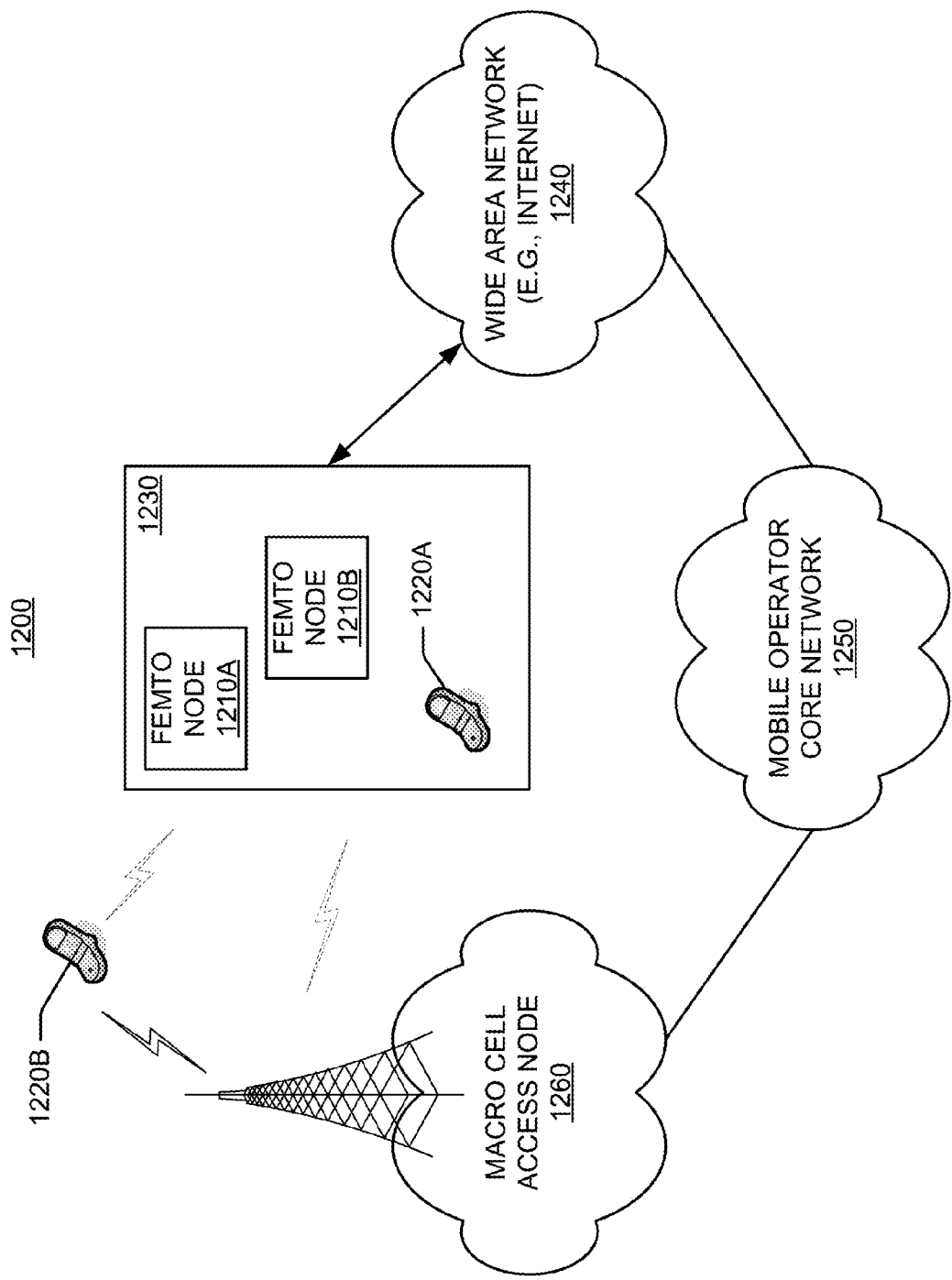
FIG. 12 is an illustration of an example wireless network environment that includes multiple types of access nodes.

FIG. 12 illustrates an exemplary communication system 1200 where one or more femto nodes are deployed within a network environment. Specifically, the system 1200 includes multiple femto nodes 1210 (e.g., femto nodes 1210A and 1210B) installed in a relatively small scale network environment (e.g., in one or more user residences 1230). Each femto node 1210 may be coupled to a wide area network 1240 (e.g., the Internet) and a mobile operator core network 1250 via a DSL router, a cable modem, a wireless link, or other connectivity means (not shown). As will be discussed below, each femto node 1210 may be configured to serve associated access terminals 1220 (e.g., access terminal 1220A) and, optionally, alien access terminals 1220 (e.g., access terminal 1220B). In other words, access to femto nodes 1210 may be restricted whereby a given access terminal 1220 may be served by a set of designated (e.g., home) femto node(s) 1210 but may not be served by any non-designated femto nodes 1210 (e.g., a neighbor's femto node 1210).

Figure 13:
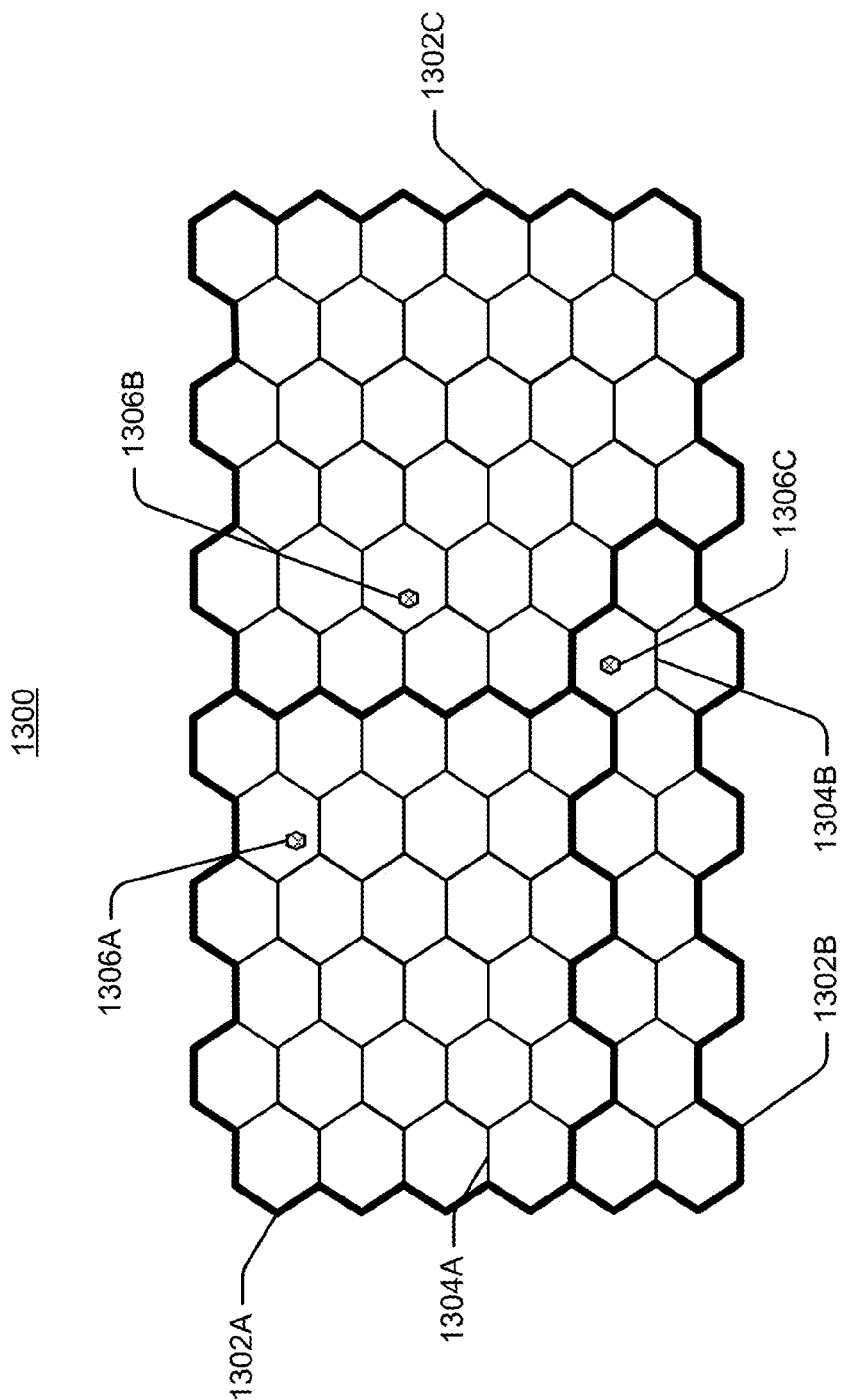
FIG. 13 is an illustration of an example wireless network environment having femto cell access points deployed within macro cells.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the hexagons. The tracking areas 1302 also include femto coverage areas 1306. In this example, each of the femto coverage areas 1306 (e.g., femto coverage area 1306C) is depicted within a macro coverage area 1304 (e.g., macro coverage area 1304B). It should be appreciated, however, that a femto coverage area 1306 may not lie entirely within a macro coverage area 1304. In practice, a large number of femto coverage areas 1306 may be defined with a given tracking area 1302 or macro coverage area 1304. Also, one or more pico coverage areas (not shown) may be defined within a given tracking area 1302 or macro coverage area 1304.

Referring again to FIG. 12, the owner of a femto node 1210 may subscribe to mobile service, such as, for example, 3G mobile service, offered through the mobile operator core network 1250. In addition, an access terminal 1220 may be capable of operating both in macro environments and in smaller scale (e.g., residential) network environments. In other words, depending on the current location of the access terminal 1220, the access terminal 1220 may be served by an access node 1260 of the macro cell mobile network 1250 or by any one of a set of femto nodes 1210 (e.g., the femto nodes 1210A and 1210B that reside within a corresponding user residence 1230). For example, when a subscriber is outside his home, he is served by a standard macro access node (e.g., node 1260) and when the subscriber is at home, he is served by a femto node (e.g., node 1210A). Here, it should be appreciated that a femto node 1220 may be backward compatible with existing access terminals 1220.

A femto node 1210 may be deployed on a single frequency or, in the alternative, on multiple frequencies. Depending on the particular configuration, the single frequency or one or more of the multiple frequencies may overlap with one or more frequencies used by a macro node (e.g., node 1260).

In some aspects, an access terminal 1220 may be configured to connect to a preferred femto node (e.g., the home femto node of the access terminal 1220) whenever such connectivity is possible. For example, whenever the access terminal 1220 is within the user's residence 1230, it may be desired that the access terminal 1220 communicate only with the home femto node 1210.

In some aspects, if the access terminal 1220 operates within the macro cellular network 1250 but is not residing on its most preferred network (e.g., as defined in a preferred roaming list), the access terminal 1220 may continue to search for the most preferred network (e.g., the preferred femto node 1210) using a Better System Reselection (BSR), which may involve a periodic scanning of available systems to determine whether better systems are currently available, and subsequent efforts to associate with such preferred systems. With the acquisition entry, the access terminal 1220 may limit the search for specific band and channel. For example, the search for the most preferred system may be repeated periodically. Upon discovery of a preferred femto node 1210, the access terminal 1220 selects the femto node 1210 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1210 that reside within the corresponding user residence 1230). In some implementations, a node may be restricted to not provide, for at least one node, at least one of: signaling, data access, registration, paging, or service.

In some aspects, a restricted femto node (which may also be referred to as a Closed Subscriber Group Home Node B) is one that provides service to a restricted provisioned set of access terminals. This set may be temporarily or permanently extended as necessary. In some aspects, a Closed Subscriber Group (CSG) may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
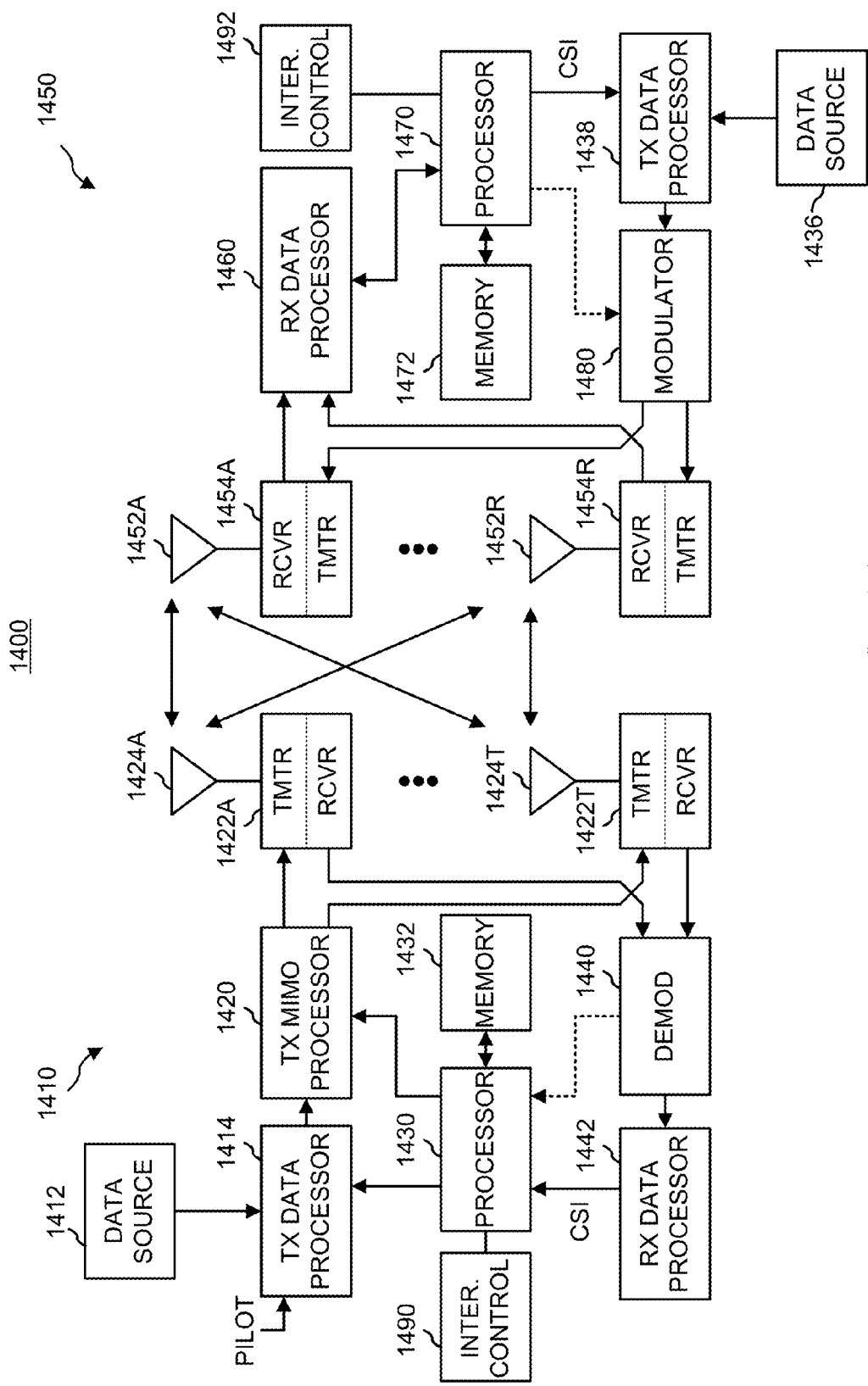
FIG. 14 is an illustration of an example wireless network environment that can be employed in conjunction with the various systems and methods described herein.

The teachings herein may be incorporated into a node (e.g., a device) employing various components for communicating with at least one other node. FIG. 14 depicts several sample components that may be employed to facilitate communication between nodes. Specifically, FIG. 14 illustrates a wireless device 1410 (e.g., an access point) and a wireless device 1450 (e.g., an access terminal) of a MIMO system 1400. At the device 1410, traffic data for a number of data streams is provided from a data source 1412 to a transmit (TX) data processor 1414.

In some aspects, each data stream is transmitted over a respective transmit antenna. The TX data processor 1414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides $N_T$ modulation symbol streams to $N_T$ transceivers (XCVR) 1422A through 1422T. In some aspects, the TX MIMO processor 1420 applies beam-forming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422A through 1422T are then transmitted from $N_T$ antennas 1424A through 1424T, respectively.

At the device 1450, the transmitted modulated signals are received by $N_R$ antennas 1452A through 1452R and the received signal from each antenna 1452 is provided to a respective transceiver (XCVR) 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive (RX) data processor 1460 then receives and processes the $N_R$ received symbol streams from $N_R$ transceivers 1454 based on a particular receiver processing technique to provide $N_T$ "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use (discussed below). The processor 1470 formulates a reverse link message comprising a matrix index portion and a rank value portion. A data memory 1472 may store program code, data, and other information used by the processor 1470 or other components of the device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1420, conditioned by the transceivers 1454A through 1454R, and transmitted back to the device 1410.

At the device 1410, the modulated signals from the device 1450 are received by the antennas 1424, conditioned by the transceivers 1422, demodulated by a demodulator (DEMOD) 1440, and processed by a RX data processor 1442 to extract the reverse link message transmitted by the device 1450. The processor 1430 then determines which pre-coding matrix to use for determining the beam-forming weights then processes the extracted message.

FIG. 14 also illustrates that the communication components may include one or more components that perform interference control operations as taught herein. For example, an interference (INTER) control component 1490 may cooperate with the processor 1430 and/or other components of the device 1410 to send/receive signals to/from another device (e.g., device 1450) as taught herein. Similarly, an interference control component 1492 may cooperate with the processor 1470 and/or other components of the device 1450 to send/receive signals to/from another device (e.g., device 1410). It should be appreciated that for each device 1410 and 1450 the functionality of two or more of the described components may be provided by a single component. For example, a single processing component may provide the functionality of the interference control component 1490 and the processor 1430 and a single processing component may provide the functionality of the interference control component 1492 and the processor 1470.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
   receiving cell identifier split information related to one or more cells in one of a plurality of overhead messages based at least in part on a network deployment, wherein the cell identifier split information indicates whether a list or range of the one or more cell identifiers belong to one or more closed subscriber group (CSG) cells, whether one or more frequencies are dedicated to CSG cell operation, or any combination thereof; and
   utilizing, by a mobile device, the cell identifier split information to identify at least one of the one or more cells based at least in part on a broadcast signal received from the at least one of the one or more cells.

2. The method of claim 1, wherein the receiving the cell identifier split information includes receiving the cell identifier split information in an overhead message that includes parameters related to one or more of cell selection or cell reselection.

3. The method of claim 2, wherein the network deployment indicates that only CSG cells transmit the cell identifier split information.

4. The method of claim 2, wherein the receiving the cell identifier split information in the overhead message includes receiving the cell identifier split information in a system information block 3 (SIB3) message from a target Node B.

5. The method of claim 2, further comprising receiving a CSG identifier in the overhead message.

6. The method of claim 5, further comprising determining whether one or more of the cell selection or the cell reselection is allowed to a target Node B transmitting the overhead message based at least in part on comparing the CSG identifier to a stored white list of cell identifiers.

7. The method of claim 6, further comprising storing the cell identifier split information as related to cells to one or more of avoid or exploit based at least in part on whether the stored white list of cell identifiers is empty.

8. The method of claim 1, wherein the receiving the cell identifier split information includes receiving the cell identifier split information in an overhead message that includes a dedicated frequency list for CSG cells.

9. The method of claim 8, wherein the receiving the cell identifier split information in the overhead message includes receiving the cell identifier split information in a system information block 11 bis (SIB11bis) message from a source Node B.

10. The method of claim 1, further comprising receiving a neighbor list comprising a plurality of cell identifiers relating to neighboring cells from a cell from which the cell identifier split information is received.

11. The method of claim 10, further comprising storing cell identifiers in the neighbor list that are absent from the cell identifier split information as relating to macro cells.

12. The method of claim 1, wherein the cell identifier split information relates to a range of cell identifiers corresponding to cells of similar type and operating on similar frequencies to a cell implemented by a Node B from which the cell identifier split information is received.

13. The method of claim 1, wherein the cell identifier split information relates to a list of cell identifiers corresponding to cells of similar type and operating on similar frequencies to a cell implemented by a Node B from which the cell identifier split information is received.

14. A wireless communications apparatus, comprising:
at least one processor configured to:
obtain cell identifier split information relating to one or more cells in one of a plurality of overhead messages based at least in part on a network deployment, wherein the cell identifier split information indicates whether a list or range of the one or more cell identifiers belong to one or more closed subscriber group (CSG) cells, whether one or more frequencies are dedicated to CSG cell operation, or any combination thereof; and
store the cell identifier split information to indicate cells to one or more of avoid or exploit in subsequent cell identifying; and
a memory coupled to the at least one processor.

15. The wireless communications apparatus of claim 14, wherein the one of the plurality of overhead messages comprises one or more of cell selection or cell reselection parameters.

16. The wireless communications apparatus of claim 15, wherein the one of the plurality of overhead messages is a system information block 3 (SIB3) message.

17. The wireless communications apparatus of claim 15, wherein the at least one processor is further configured to obtain a CSG identifier received in the one of the plurality of overhead messages.

18. The wireless communications apparatus of claim 15, wherein the at least one processor is further configured to determine whether access is allowed to a Node B from which the one of the plurality of overhead messages is received based at least in part on whether a CSG identifier is present in a stored white list of CSG cells.

19. The wireless communications apparatus of claim 18, wherein the at least one processor is further configured to store the cell identifier split information to indicate the cells to one or more of exploit or avoid in subsequent cell identifying based on whether the stored white list of CSG cells is empty.

20. The wireless communications apparatus of claim 14, wherein the one of the plurality of overhead messages comprises a dedicated frequency list for CSG cells.

21. The wireless communications apparatus of claim 20, wherein the one of the plurality of overhead messages is a system information block 11 bis (SIB11bis) message.

22. The wireless communications apparatus of claim 14, wherein the at least one processor is further configured to receive a neighbor list comprising a plurality of cell identifiers relating to neighboring Node Bs from a Node B from which the one of the plurality of overhead messages is received.

23. The wireless communications apparatus of claim 22, wherein the at least one processor is further configured to store cell identifiers from the neighbor list as relating to macro cells where the cell identifiers from the neighbor list are not present in the cell identifier split information.

24. The wireless communications apparatus of claim 14, wherein the cell identifier split information relates to a range of cell identifiers corresponding to cells of similar type and operating on similar frequencies to a cell implemented by a Node B from which the one of the plurality of overhead messages is received.

25. An apparatus, comprising:
means for receiving an overhead message comprising cell identifier split information related to one or more cells, wherein the overhead message in which the cell identifier split information is received is based at least in part on a network deployment, wherein the cell identifier split information indicates whether a list or range of the one or more cell identifiers belong to one or more closed subscriber group (CSG) cells, whether one or more frequencies are dedicated to CSG cell operation, or any combination thereof;
means for determining the cell identifier split information from the overhead message; and
means for storing the cell identifier split information to indicate cells to one or more of exploit or avoid in subsequent cell searching.

26. The apparatus of claim 25, wherein the overhead message comprises one or more of cell selection or cell reselection parameters.

27. The apparatus of claim 26, wherein the overhead message is a system information block 3 (SIB3) message.

28. The apparatus of claim 26, further comprising means for obtaining a CSG identifier in the overhead message.

29. The apparatus of claim 28, further comprising means for determining whether access is allowed to a Node B from which the means for receiving receives the overhead message based at least in part on whether the CSG identifier is present in a white list of CSG cells.

30. The apparatus of claim 29, wherein the means for storing the cell identifier split information stores the cell identifier split information to indicate the cells to one or more of exploit or avoid based at least in part on whether the white list of CSG cells is empty.

31. The apparatus of claim 25, wherein the overhead message comprises dedicated frequency information for CSG cells.

32. The apparatus of claim 31, wherein the overhead message is a system information block 11 bis (SIB11bis) message.

33. The apparatus of claim 25, wherein the means for receiving the overhead message receives a neighbor list comprising cell identifiers of neighboring Node Bs from a Node B from which the means for receiving receives the overhead message.

34. The apparatus of claim 33, wherein the means for storing the cell identifier split information stores cell identifiers present in the neighbor list but not present in the cell identifier split information as relating to macro cell Node Bs.

35. The apparatus of claim 25, wherein the cell identifier split information relates to a range of cell identifiers corresponding to cells of similar type and operating on similar frequencies to a cell implemented by a Node B from which the means for receiving receives the overhead message.

36. A non-transitory computer-readable medium comprising:
code for causing at least one computer to receive cell identifier split information related to one or more cells in one of a plurality of overhead messages based at least in part on a network deployment, wherein the cell identifier split information indicates whether a list or range of the one or more cell identifiers belong to one or more closed subscriber group (CSG) cells, whether one or more frequencies are dedicated to CSG cell operation, or any combination thereof; and code for causing the at least one computer to utilize the cell identifier split information to identify at least one of the one or more cells based at least in part on a broadcast signal received from the at least one of the one or more cells.

37. The non-transitory computer-readable medium of claim 36, wherein the code for causing the at least one computer to receive the cell identifier split information further causes the at least one computer to receive the cell identifier split information in an overhead message that includes parameters related to one or more of cell selection or cell reselection.

38. The non-transitory computer-readable medium of claim 37, wherein the code for causing the at least one computer to receive the cell identifier split information in the overhead message further causes the at least one computer to receive the cell identifier split information in a system information block 3 (SIB3) message from a Node B.

39. The non-transitory computer-readable medium of claim 37, further comprising code for causing the at least one computer to receive a CSG identifier in the overhead message.

40. The non-transitory computer-readable medium of claim 39, further comprising code for causing the at least one computer to determine whether one or more of the cell selection or the cell reselection is allowed to a Node B transmitting the overhead message based at least in part on comparing the CSG identifier to a stored white list of cell identifiers.

41. The non-transitory computer-readable medium of claim 40, further comprising code for causing the at least one computer to store the cell identifier split information as related to cells to one or more of avoid or exploit based at least in part on whether the stored white list of cell identifiers is empty.

42. The non-transitory computer-readable medium of claim 36, wherein the code for causing the at least one computer to receive the cell identifier split information further causes the at least one computer to receive the cell identifier split information in an overhead message that includes a dedicated frequency list for CSG cells.

43. The non-transitory computer-readable medium of claim 42, wherein the code for causing the at least one computer to receive the cell identifier split information further causes the at least one computer to receive the cell identifier split information in a system information block 11 bis (SIB11bis) message from a source Node B.

44. The non-transitory computer-readable medium of claim 36, further comprising code for causing the at least one computer to receive a neighbor list comprising a plurality of cell identifiers relating to neighboring Node Bs from a Node B from which the cell identifier split information is received.

45. The non-transitory computer-readable medium of claim 44, further comprising code for causing the at least one computer to store cell identifiers in the neighbor list that are absent from the cell identifier split information as relating to macro cells.

46. The non-transitory computer-readable medium of claim 36, wherein the cell identifier split information relates to a range of cell identifiers corresponding to cells of similar type and operating on similar frequencies to a cell implemented by a Node B from which the cell identifier split information is received.

47. An apparatus, comprising:

an overhead message processing component configured to obtain an overhead message comprising cell identifier split information related to one or more cells, wherein the overhead message in which the cell identifier split information is received is based at least in part on a network deployment, wherein the cell identifier split information indicates whether a list or range of the one or more cell identifiers belong to one or more closed subscriber group (CSG) cells, whether one or more frequencies are dedicated to CSG cell operation, or any combination thereof;

a cell identifier split information receiving component configured to determine the cell identifier split information from the overhead message; and a cell identifier split information storing component configured to store the cell identifier split information to indicate cells to one or more of exploit or avoid in subsequent cell searching.

48. The apparatus of claim 47, wherein the overhead message comprises one or more of cell selection or cell reselection parameters.

49. The apparatus of claim 48, wherein the overhead message is a system information block 3 (SIB3) message.

50. The apparatus of claim 48, further comprising a CSG identifier receiving component configured to obtain a CSG identifier in the overhead message.

51. The apparatus of claim 50, further comprising an access determining component configured to discern whether access is allowed to a Node B from which the overhead message processing component obtained the overhead message based at least in part on whether the CSG identifier is present in a white list of CSG cells.

52. The apparatus of claim 51, wherein the cell identifier split information storing component is configured to store the cell identifier split information to indicate cells to one or more of exploit or avoid based at least in part on whether the white list of CSG cells is empty.

53. The apparatus of claim 47, wherein the overhead message comprises dedicated frequency information for CSG cells.

54. The apparatus of claim 53, wherein the overhead message is a system information block 11 bis (SIB11bis) message.

55. The apparatus of claim 47, wherein the overhead message processing component is further configured to obtain a neighbor list comprising cell identifiers of neighboring Node Bs from a Node B from which the overhead message processing component obtained the overhead message.

56. The apparatus of claim 55, wherein the cell identifier split information storing component is configured to store cell identifiers present in the neighbor list but not present in the cell identifier split information as relating to macro cell Node Bs.

57. The apparatus of claim 47, wherein the cell identifier split information relates to a range of cell identifiers corresponding to cells of similar type and operating on similar frequencies to a cell implemented by a Node B from which the overhead message processing component obtained the overhead message.

58. A method, comprising:

receiving cell identifier split information relating to one or more cells of similar type and operating over similar frequencies, wherein the cell identifier split information indicates whether a list or range of the one or more cell identifiers belong to one or more closed subscriber group (CSG) cells, whether one or more frequencies are dedicated to CSG cell operation, or any combination thereof;

selecting an overhead message for transmitting the cell identifier split information based at least in part on a network deployment; and transmitting, by a base station, the overhead message including the cell identifier split information to one or more wireless devices.

59. The method of claim 58, wherein selecting the overhead message includes selecting a system information block 3 (SIB3) message where the network deployment indicates one or more of only femto cell access points transmit the cell identifier split information or only a subset of macro cell access points transmit the cell identifier split information.

60. The method of claim 59, further comprising including one or more access restriction parameters in the SIB3 message.

61. The method of claim 60, wherein the one or more access restriction parameters includes a CSG identifier.

62. The method of claim 58, wherein selecting the overhead message includes selecting a system information block 11 bis (SIB11bis) message where the network deployment indicates macro cell and femto cell access points transmit the cell identifier split information.

63. The method of claim 62, further comprising including a dedicated frequency list for CSG cells in the SIB11bis message.

64. The method of claim 58, wherein the receiving the cell identifier split information includes receiving the cell identifier split information from one or more of a network device, a configuration, a specification, or a hardcoding.

65. The method of claim 58, wherein the selecting the overhead message is based at least in part on an access point type.

66. A wireless communications apparatus, comprising:
at least one processor configured to:
receive cell identifier split information related to one or more cells operating over a similar frequency, wherein the cell identifier split information indicates whether a list or range of the one or more cell identifiers belong to one or more closed subscriber group (CSG) cells, whether one or more frequencies are dedicated to CSG cell operation, or any combination thereof;
determine an overhead message for transmitting the cell identifier split information based at least in part on a network deployment; and
transmit the overhead message to one or more devices using the overhead message; and
a memory coupled to the at least one processor.

67. The wireless communications apparatus of claim 66, wherein the at least one processor is further configured to determine the overhead message to be a system information block 3 (SIB3) message where the network deployment indicates that only femto cell access points provide the cell identifier split information.

68. The wireless communications apparatus of claim 67, wherein the at least one processor is further configured to include one or more access restriction parameters in the SIB3 message.

69. The wireless communications apparatus of claim 66, wherein the at least one processor is further configured to determine the overhead message as a system information block 11 bis (SIB11bis) message where the network deployment indicates that macro cell and femto cell access points provide the cell identifier split information.

70. The wireless communications apparatus of claim 69, wherein the at least one processor is further configured to include a dedicated frequency list for CSG cells in the SIB11bis message.

71. An apparatus, comprising:
means for receiving cell identifier split information related to one or more cells operating over a similar frequency, wherein the cell identifier split information indicates whether a list or range of the one or more cell identifiers belong to one or more closed subscriber group (CSG) cells, whether one or more frequencies are dedicated to CSG cell operation, or any combination thereof;
means for selecting an overhead message within which to include the cell identifier split information based at least in part on a network deployment; and
means for providing the overhead message with the cell identifier split information to one or more wireless devices.

72. The apparatus of claim 71, wherein the means for selecting the overhead message selects a system information block 3 (SIB3) message where the network deployment specifies that one or more of only femto cell access points provide the cell identifier split information or only a subset of macro cell access points transmit the cell identifier split information.

73. The apparatus of claim 72, wherein the means for selecting the overhead message includes one or more access restriction parameters in the SIB3 message.

74. The apparatus of claim 71, wherein the means for selecting the overhead message selects a system information block 11 bis (SIB11bis) message where the network deployment specifies that macro cell and femto cell access points provide the cell identifier split information.

75. The apparatus of claim 74, wherein the means for selecting the overhead message includes a dedicated frequency list for CSG cells in the SIB11bis message.

76. The apparatus of claim 71, wherein means for receiving the cell identifier split information receives the cell identifier split information from one or more of a network device, a configuration, a specification, or a hardcoding.

77. The apparatus of claim 71, wherein the means for selecting selects the overhead message based at least in part on an access point type of the apparatus.

78. A non-transitory computer-readable medium comprising:
code for causing at least one computer to receive cell identifier split information relating to one or more cells of similar type and operating over similar frequencies, wherein the cell identifier split information indicates whether a list or range of the one or more cell identifiers belong to one or more closed subscriber group (CSG) cells, whether one or more frequencies are dedicated to CSG cell operation, or any combination thereof;
code for causing the at least one computer to select an overhead message for transmitting the cell identifier split information based at least in part on a network deployment; and
code for causing the at least one computer to transmit the overhead message including the cell identifier split information to one or more wireless devices.

79. The non-transitory computer-readable medium of claim 78, wherein the code for causing the at least one computer to select the overhead message further causes the at least one computer to select a system information block 3

(SIB3) message where the network deployment indicates only femto cell access points transmit the cell identifier split information.

80. The non-transitory computer-readable medium of claim 79, further comprising code for causing the at least one computer to include one or more access restriction parameters in the SIB3 message.

81. The non-transitory computer-readable medium of claim 78, wherein the code for causing the at least one computer to select the overhead message further causes the at least one computer to select a system information block 11 bis (SIB11bis) message where the network deployment indicates macro cell and femto cell access points transmit the cell identifier split information.

82. The non-transitory computer-readable medium of claim 81, further comprising code for causing the at least one computer to include a dedicated frequency list for CSG cells in the SIB11bis message.

83. An apparatus, comprising:
- a cell identifier split information determining component configured to receive cell identifier split information related to one or more cells operating over a similar frequency, wherein the cell identifier split information indicates whether a list or range of the one or more cell identifiers belong to one or more closed subscriber group (CSG) cells, whether one or more frequencies are dedicated to CSG cell operation, or any combination thereof;
- an overhead message generating component configured to select an overhead message within which to include the cell identifier split information based at least in part on a network deployment; and
- an overhead message transmitting component configured to provide the overhead message with the cell identifier split information to one or more wireless devices.

84. The apparatus of claim 83, wherein the overhead message generating component is further configured to select a system information block 3 (SIB3) message where the network deployment specifies that only femto cell access points provide the cell identifier split information.

85. The apparatus of claim 84, wherein the overhead message generating component is further configured to include one or more access restriction parameters in the SIB3 message.

86. The apparatus of claim 83, wherein the overhead message generating component is further configured to select a system information block 11 bis (SIB11bis) message where the network deployment specifies that macro cell and femto cell access points provide the cell identifier split information.

87. The apparatus of claim 86, wherein the overhead message generating component is further configured to include a dedicated frequency list for CSG cells in the SIB11bis message.

* * * * *